United States Patent [19]

Tabata et al.

[11] Patent Number: 5,150,375
[45] Date of Patent: Sep. 22, 1992

[54] SUBSTANCE VAPORIZING APPARATUS

[75] Inventors: Yoichiro Tabata; Yoshihiro Ueda; Shigeo Ueguri; Kazuhiko Hara, all of Hyogo, Japan

[73] Assignee: Mitsubishi Denki Kabushiki Kaisha, Tokyo, Japan

[21] Appl. No.: 535,615

[22] Filed: Jun. 11, 1990

[30] Foreign Application Priority Data

Jun. 14, 1989 [JP] Japan ............................. 1-151927
Jun. 14, 1989 [JP] Japan ............................. 1-151933
Jun. 14, 1989 [JP] Japan ............................. 1-152675

[51] Int. Cl.$^5$ .............................................. H01S 3/08
[52] U.S. Cl. ...................................... 372/98; 372/56; 372/88
[58] Field of Search ................... 372/56, 92, 87, 88, 372/98

[56] References Cited

U.S. PATENT DOCUMENTS

| | | | |
|---|---|---|---|
| 4,510,608 | 4/1985 | Fujii et al. | 372/56 |
| 4,639,926 | 1/1987 | Wang et al. | 372/56 |
| 4,701,925 | 10/1987 | Fuke et al. | 372/56 |
| 4,794,612 | 12/1988 | Fuke | 372/56 |
| 4,862,475 | 8/1989 | Deki | 372/56 |

Primary Examiner—Léon Scott, Jr.
Attorney, Agent, or Firm—Rothwell, Figg, Ernst & Kurz

[57] ABSTRACT

A substance vaporizing apparatus which uses a vapor of a substance generated by heating the substance in a gas-filled tube as an exciting medium or an ionizing medium. The apparatus employs an improved container for containing the substance within the gas-filled tube. The improved container suppresses the rate of emission of the vapor of the substance into a discharge space defined by the gas-filled tube to hold the vapor density of the substance at an optimum low value for laser oscillation relative to the buffer gas density in the discharge space. Thus, the mean free path of the atoms of the substance, namely the average distance traveled by the atoms between elastic collisions with the electrons, ions and neutral atoms of the buffer gas, is increased to increase the number of atoms of the subtance excited to a higher energy level, which, consequently, increases laser power and enhances laser beam or ion beam accelerating energy. The employment of segmental discharge electrodes each consisting of a plurality of partial electrodes diametrically distributed in the discharge space of the gas-filled tube enables heating the buffer gas in a substantially uniform diametrical temperature distribution, which enables to increase the length and diameter of the laser medium. The employment of two pulse generating circuits promotes the relaxation of the atoms of the substance from a lower energy level to the ground energy level to enable the next application of a pulse voltage to establish a complete population inversion, which enables the substance vaporizing apparatus to operate at a high efficiency at a high discharge frequency.

11 Claims, 15 Drawing Sheets

SUBSTANCE VAPORIZING APPARATUS

BACKGROUND OF THE INVENTION

1. Field of the Invention

The present invention relates to a substance vaporizing apparatus for generating a vapor of a substance to be used as an ionizing medium or an exciting medium and, more specifically, to a structure capable of functioning to vaporize a substance.

2. Description of the Prior Art

A metal vapor laser and a vapor ion laser incorporate such a substance vaporizing apparatus. FIG. 1 shows a conventional metal vapor laser is published in, for example, 6th Nenji Taikai Koen Yoko-shu, 21aIIB3, pp. 60–63 (1986). As shown in FIG. 1, the metal vapor laser comprises discharge electrodes $1a$ and $1b$, a cylindrical discharge tube 2 defining a discharge space 3 in which a metal vapor 5 produced by vaporizing metal pieces 4, such as copper pieces, is excited, a heat shielf 6 formed of a heat-insulating material, such as wool, resonant mirrors $7a$ and $7b$ for laser oscillation, flanges $8a$ and $8b$ defining a sealed space including a vacuum chamber 9, an insulating tube 10, a sealing tube 11, a gas inlet port $12a$, and a gas outlet port $12b$.

In operation, a pulse voltage is applied across the electrodes $1a$ and $1b$ to form a discharge within the discharge space 3, and then a buffer gas filling the discharge space 3 is heated by the energy of accelerated ions and electrons to vaporize the metal pieces 4. The ions and electrons accelerated by a pulse discharge and having high energy and high-temperature atoms of the heated buffer gas collide against the atoms of the vaporized metal to transfer their energy to the atoms of the vaporized metal, so that the atoms of the vaporized metal is excited to a higher energy level. The heat shield 6 serves for maintaining the gas at a desired temperature to maintain a predetermined vapor density in the discharge space 3. The function of the vacuum chamber 9 is similar to that of the heat shield; the vacuum chamber 9 suppresses particularly convection heat loss. Light is emitted when the energy level of the atoms of the vaporized metal drops to a lower energy level or the ground energy level.

The light thus emitted is amplified optically by the resonant mirrors $7a$ and $7b$ to emit a laser beam outside for industrial uses, such as laser machining.

FIG. 2 shows the buffer gas temperature distribution and the vapor density distribution with respect to the diametrical and axial directions of the discharge space 3 in the metal vapor laser thus constructed. In FIG. 2, X-axis and Y-axis coincide respectively with the diametrical direction and the axial direction of the discharge space 3; temperature is measured upward on T-axis; indicated at $3a$ is the center axis of the discharge space 3 and at $3b$ are diametrically opposite ends of the discharge space. A curve l represented by a dotted line indicates temperature distribution with respect to the axial direction, curves $n_1$, $n_2$ and $n_3$ represented by alternate long and short dash line indicate vapor distribution with respect to the diametrical direction, and curves $m_1$, $m_2$ and $m_3$ represented by continuous lines indicated temperature distribution with respect to the diametrical direction. As seen in FIG. 2, the temperature of the buffer gas decreases from the central portion of the discharge space 3 around the center axis $3a$ toward the periphery of the discharge space 3 represented by the diametrically opposite ends $3b$. The temperature of the buffer gas in the vicinity of the axial ends of the discharge space 3 is lower than that in the central portion of the same. Since the vapor density distribution within the discharge tube 2 can be approximated by saturation vapor density $n_0$, which is a function of buffer gas temperature, the relation between the vapor density distribution curves $n_1$, $n_2$ and $n_3$ is expressed by: $n_1 > n_2 = n_3$.

On the other hand, when the vapor density increases relative to the buffer gas density (buffer gas pressure), the mean free path of electrons, and the ions and neutral atoms of the buffer gas decreases, and hence the kinetic energy acquired by the electrons and ions from the electric field created by a pulse discharge before colliding against the atoms of the vapor decreases and when the temperature of the atoms of the vapor increase too much, the atoms of the vapor of lower energy level increase, therefore, the population invertion between the number of atoms of the vapor of a higher energy level and that of atoms of the vapor of a lower one is not created, consequently, the electrons and the ions are unable to excite the atoms of the vapor to an energy level high enough to a give a sufficient laser gain. This conventional metal vapor laser has a disadvantage that the vapor density is high in the central portion of the discharge space 3 and hence the laser power density is low in the central portion of the discharge space 3.

FIG. 3 shows a copper vapor laser described in "Manufacture of Copper Vapor Laser" published in "Reza Kenkyu", pp. 60–66, March 1981.

Referring to FIG. 3, a vapor laser unit 100 comprises opposite electrodes 1 for forming a discharge in a gas, a discharge tube 2 containing copper particles 4, a sealing tube 11, a heat shield 6 for preventing the loss of heat generated by a discharge formed between the electrodes 1, windows 13 disposed respectively near the electrodes 1 to emit a laser beam, and an insulating break 21 provided on the sealing tube 11 for high-voltage insulation.

A first pulse circuit 200 comprises a charging capacitor 14 connected to the sealing tube 11 of the vapor laser unit 100 by a connecting line a, a charging reactor 15 connected in series to the charging capacitor 14, a high-voltage power source 17, a diode 16 having a positive electrode connected to the high-voltage power source 17 and a negative electrode connected to the charging reactor 15, a thyratron 18 connected to the charging reactor 15 and the high-voltage power source 17, and a peaking capacitor 20 connected to the charging capacitor 14 and the thyratron 18. The high-voltage power source 17 is connected to the sealing tube 11 by a connecting line b.

The charging capacitor 14 is charged at a high voltage through the diode 16, the charging reactor 15 and the peaking capacitor 20 by the high-voltage power source 17.

When the thyratron 18 is turned on by a pulse control circuit 19, the charging capacitor 14 is charged to apply a high voltage through the sealing tube 11 across the electrodes 1 to form a discharge in the discharge tube 2. Since the heat shield 6 prevents the dissipation of the thermal energy generated by the discharge within the discharge tube, the temperature within the discharge tube 2 is raised to a high temperature on the order of 1500° C., whereby the copper particles 4 are vaporized and the discharge tube 2 is filled with copper vapor.

Electrons of a plasma accelerated by the discharge formed between the opposite electodes 1 collide against copper atoms filling the discharge tube 2 to excite the copper atoms to a higher energy level corresponding to a first resonance level. Since less atoms are excited to a lower energy level corresponding to a metastable energy level, a population inversion is created. The energy level of the copper atoms drops from the higher energy level to a lower energy level with laser oscillation, and then drops gradually from the lower energy level to the ground energy level. This cycle is repeated at a frequency of several kilohertzs. The laser beam is emitted through the windows 13.

The drop of the energy level from the lower energy level to the ground energy level is caused by the collision of the excited atoms against the wall of the discharge tube 2 when the discharge tube has a relatively small diameter, and is caused by the superelastic collision of the atoms of the lower energy level and the slow electrons when the discharge tube 2 has a relatively large diameter, and the lifetime of the atoms on the lower energy level is as long as several hundreds microseconds.

When the high-voltage pulse is applied across the electrodes 1 at a long interval corresponding to the long time of several hundreds microseconds required for the lower energy level to drop to the ground energy level, the frequency of high-voltage pulse application is reduced. On the other hand, atoms of the lower energy level increases when the high-voltage pulse is applied at a high frequency, so that an incomplete population inversion is created and hence the copper vapor laser is unable to operate at a high efficiency.

SUMMARY OF THE INVENTION

The present invention has been made to solve those problems in the conventional substance vaporizing apparatus for generating a vapor of a substance.

Accordingly, it is a first object of the present invention to provide a substance vaporizing apparatus capable of enhancing the acceleration energy of a laser or an ion beam through the enhancement of laser power by maintaining the density of a vapor of a substance at a value optimum for laser oscillation, which is a relatively low vapor density as compared with the density of a buffer gas filling a discharge space, by suppressing the vaporization of the substance in the discharge space so that the mean free path of the atoms of the vaporized substance is increased thereby increasing the number of atoms of the vaporized substance excited to a higher energy level is increased.

It is a second object of the present invention to provide a substance vaporizing apparatus capable of making substantially uniform the temperature distribution of a buffer gas in a discharge space with respect to the diametrical direction so that a region of a vapor density and a buffer gas temperature meeting optimum conditions for laser oscillation is increased in the discharge space and capable of increasing time period for laser oscillation.

It is a third object of the present invention to provide a substance vaporizing apparatus capable of operating at a high efficiency at a high voltage pulse application frequency by promoting the drop of the energy level of atoms of a substance from a lower energy level to the ground energy level in a time interval between successive voltage pulses to create a complete population inversion for the subsequent voltage pulse application.

In a first aspect of the present invention to achieve the first object of the invention, a substance vaporizing apparatus which uses a vapor of a substance generated by heating the substance in a gas-filled tube as an exciting medium or an ionizing medium is provided with a container containing the substance, disposed within the gas-filled tube and provided with a plurality of through holes in its wall. The container containing the substance and provided within the gas-filled tube of the substance vaporizing apparatus in the first aspect of the present invention emits the vapor of the substance generated therein through the plurality of through holes into a discharge space defined by the gas-filled tube at a controlled emitting rate to regulate the vapor density of the vapor of the substance relative to the density of a buffer gas.

In a second aspect of the present invention to achieve the first object of the invention, a substance vaporizing apparatus comprises one or a plurality of containers containing a substance and provided each with a plurality of through holes in its wall. The respective diameter of the through holes nearer to the axially opposite ends of the container is greater than those of the through holes nearer to the middle of the container or intervals between the through holes nearer to the axially opposite ends of the container are smaller than those of the through holes nearer to the middle of the container. Thus the vapor emitting rate of the container is varied with respect to the axial direction of the gas-filled tube so that a uniform vapor density distribution of the vapor of the substance with respect to the axial direction of the gas-filled tube is established.

In a third aspect of the present invention to achieve the first object of the invention, a substance vaporizing apparatus comprises a gas-filled tube, and a porous member wrapping a substance and provided within the gas-filled tube. The porous member suppresses the vaporization of the substance into a discharge space defined by the gas-filled tube and controls the vapor density of the vapor of the substance within the gas-filled tube.

In a fourth aspect of the present invention to achieve the first object of the invention, a substance vaporizing apparatus comprises a gas-filled tube, and a plurality of containers containing a substance, arranged around a discharge space defined by the gas-filled tube, and provided each with at least one through hole in its wall. The vapor of the substance is emitted through the through holes of the containers into the discharge space so that a uniform vapor density distribution is established in the gas-filled tube.

In a fifth aspect of the present invention to achieve the first object of the invention, a substance vaporizing apparatus comprises a gas-filled tube defining a discharge space, a container containing a substance disposed within the discharge space, and a holding member fixedly holding the container. The holding member holding the container facilitates controlling the vapor density distribution within the gas-filled tube.

In a sixth aspect of the present invention to achieve the first object of the invention, a substance vaporizing apparatus comprises a gas-filled tube, a container containing a substance and provided with at least one through hole in its wall, and a pair of electrodes provided within the container. A voltage is applied across the pair of electrodes for forming a discharge to heat the substance so that the quantity of the vapor generated within the container is controlled comparatively accurately.

In a seventh aspect of the present invention to achieve the second object of the invention, a substance vaporizing apparatus comprises a gas-filled tube defining a discharge space and provided with a pair of electrodes axially opposite to each other within the discharge space, wherein at least one of the electrodes is a segmental electrode consisting of a plurality of partial electrodes diametrically arranged at intervals within the discharge space. A pulse voltage is applied to the plurality of partial electrodes to form discharges at diametrically different positions to heat the buffer gas substantially uniformly in a plurality of diametrically divided regions, so that the buffer gas can be heated in a substantially uniform temperature distribution with respect to the diameter of the discharge space, and hence the length and diameter of the laser medium can be increased. Furthermore, the pulse discharges in a plurality of diametrically divided regions in the discharge space increase the duration of laser oscillation in a unit time interval.

In an eighth aspect of the present invention to achieve the second object of the invention, a substance vaporizing apparatus comprises a pair of electrodes, each electrode being a sectional electrode consisting of a plurality of partial electrodes, and a pulse phase controller for controlling the respective phases of pulse voltages to apply pulse voltages of different phases respectively to the plurality of partial electrodes. This substance vaporizing apparatus has a further function in addition to that of the substance vaporizing apparatus in the seventh aspect of the present invention. The sequential application of pulse voltages of different phases to the partial electrodes enables the energy level of the atoms in each region in the discharge space to drop from a lower energy level to the ground energy level during the interruption of the pulse discharge increase in the number of atoms excited to the lower energy level by each pair of partial electrodes can be suppressed.

In a ninth aspect of the present invention to achieve the second object of the invention, a substance vaporizing apparatus comprises a pair of electrodes, each being a sectional electrode consisting of a plurality of partial electrodes, and tubes B provided respectively for the pairs of partial electrodes. Beside, a plurality of tubes B provided for the discharge space 3 having a pair of electrodes shown in FIG. 1. Collision of excited atoms of a lower the pairs of partial electrodes. Collision of excited atoms of a lower energy level against the tubes B promotes the energy level of the atoms from the lower energy level to the ground energy level during the interruption of the pulse discharges, so that increase in the number of atoms excited to the lower energy level can be suppressed in each region corresponding to each pair of partial electrodes.

In a tenth aspect of the present invention to achieve the third object of the invention, a substance vaporizing apparatus comprises a discharge tube, a first pulse generating circuit for applying a first pulse voltage for laser oscillation, a second pulse generating circuit for applying a second pulse voltage delayed by a predetermined time interval from the first pulse voltage to the discharge tube, and auxiliary electrodes having a relatively small surface area and disposed opposite to the discharge tube. The second pulse voltage is applied across the auxiliary electrodes. The second pulse voltage is applied across the auxiliary electrodes having a relatively small surface area in a time interval between the successive first pulse voltages generated by the first pulse generating circuit to stabilize discharges by fixing a discharge forming position, so that atoms of lower energy level and slow electrons are brought forcibly into superelastic collision. Consequently, relaxation of the atoms of the lower energy level is promoted so that a population inversion is improved by the application of the next first pulse voltage, and the reduction of the laser efficiency can be prevented even if the first pulse voltage is applied at a high frequency.

The above and other objects, features and advantages of the present invention will become more apparent from the reading of the following description with reference to the accompanying drawings, which, however, are intended only to illustrate the invention and are not to be construed to limit the scope of the present invention.

BRIEF DESCRIPTION OF THE DRAWINGS

FIGS. 5(a) to 5(d) are graphs of assistance in explaining the laser oscillation of a metal vapor laser, in which FIG. 5(a) shows the waveform of discharge current, in which time (t) is measured on the horizontal axis and discharge current is measured on the vertical axis, FIG. 5(b) shows the distribution of the kinetic energy (Pe) of ions and electrons (the temperature of ions and electrons), in which the kinetic energy (Pe) of ions and electrons is measured on the horizontal axis and the number (Ne) of ions and electrons is measured on the vertical axis, FIG. 5(c) shows the distribution of the energy (Pg) of the buffer gas (the temperature of the buffer gas), in which the energy of the buffer gas is measured on the horizontal axis and the number (Ng) of atoms of the buffer gas is measured on the vertical axis, and FIG. 5(d) shows the distribution of the energy level (Pj) of the atoms of the vapor, in which the energy level of atoms of the vapor is measured on the horizontal axis and the number (Nj) of atoms of the vapor is measured on the vertical axis;

DETAILED DESCRIPTION OF THE PREFERRED EMBODIMENTS

Preferred embodiments of the present invention will be described hereinafter with reference to the accompanying drawings.

First Embodiment

Figure 1:
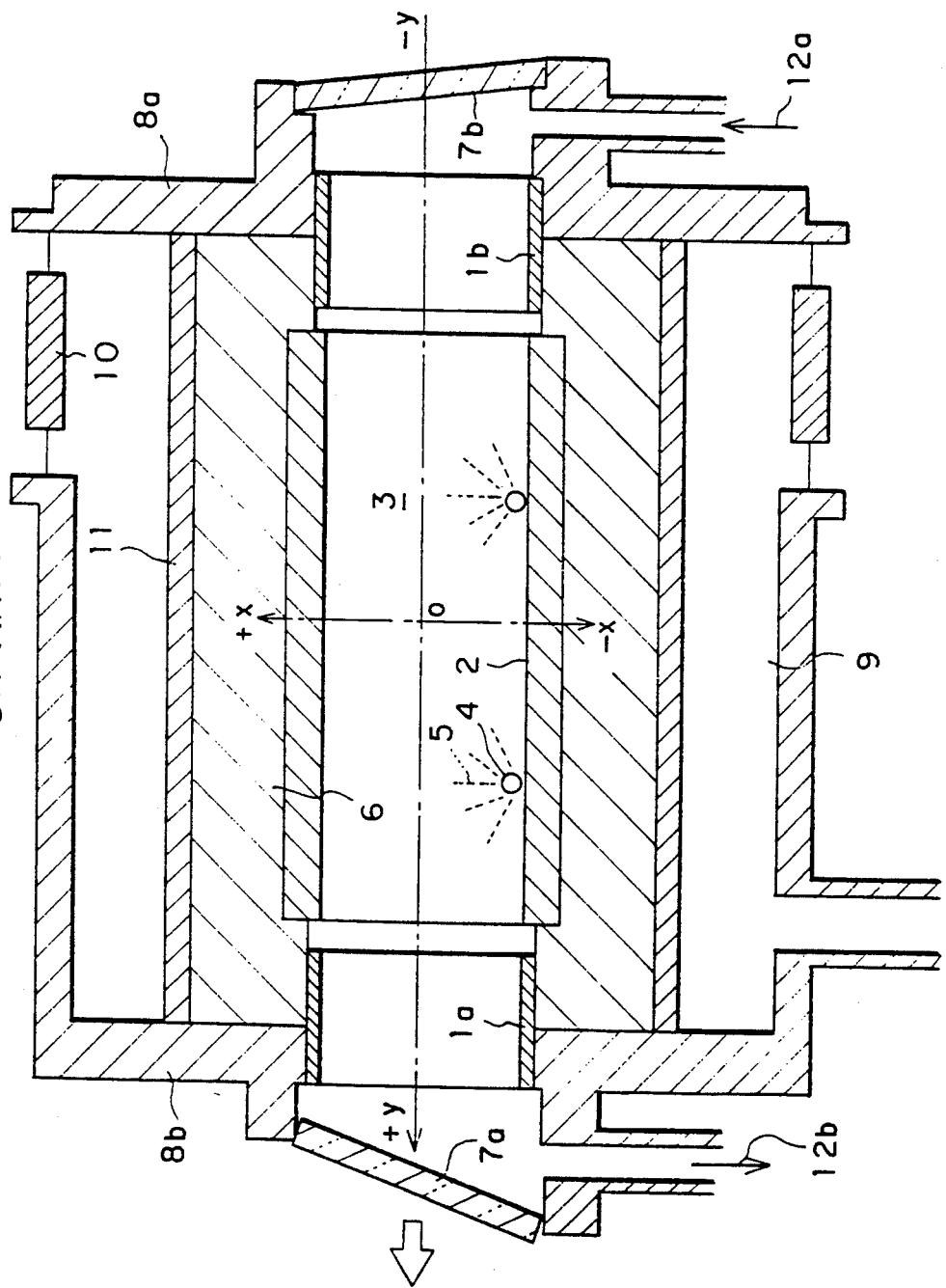
FIG. 1 is a schematic sectional view of a conventional metal vapor laser.
Figure 2:
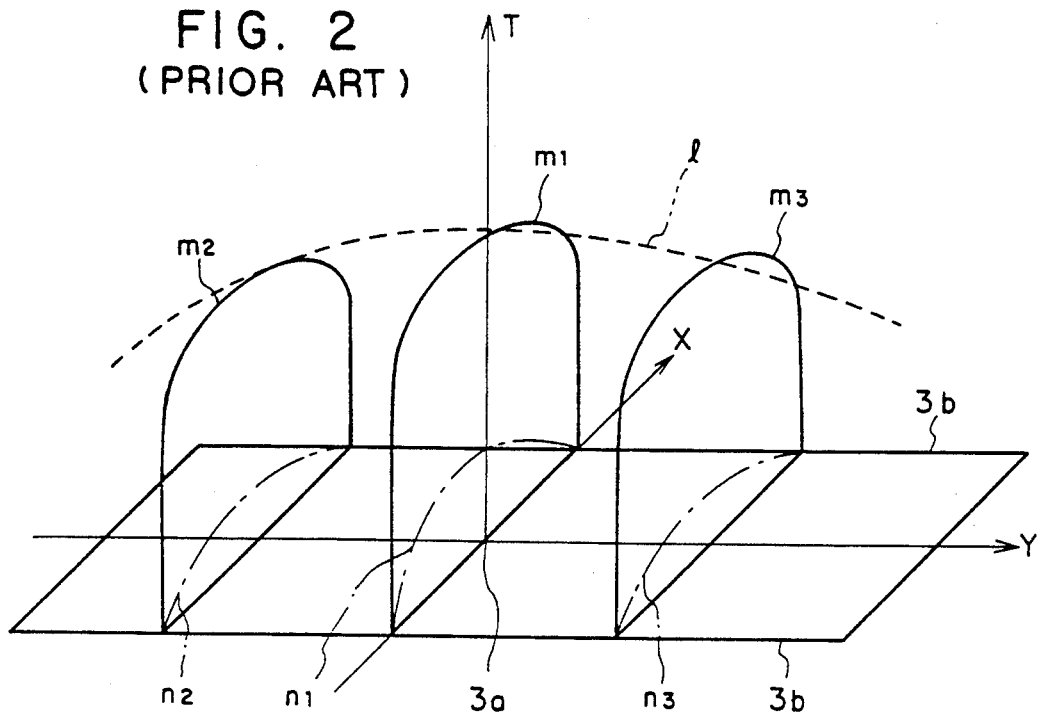
FIG. 2 is a graph showing the diametrical temperature distribution and the diametrical vapor density distribution in the discharge tube of a conventional substance vaporizing apparatus.
Figure 4A:
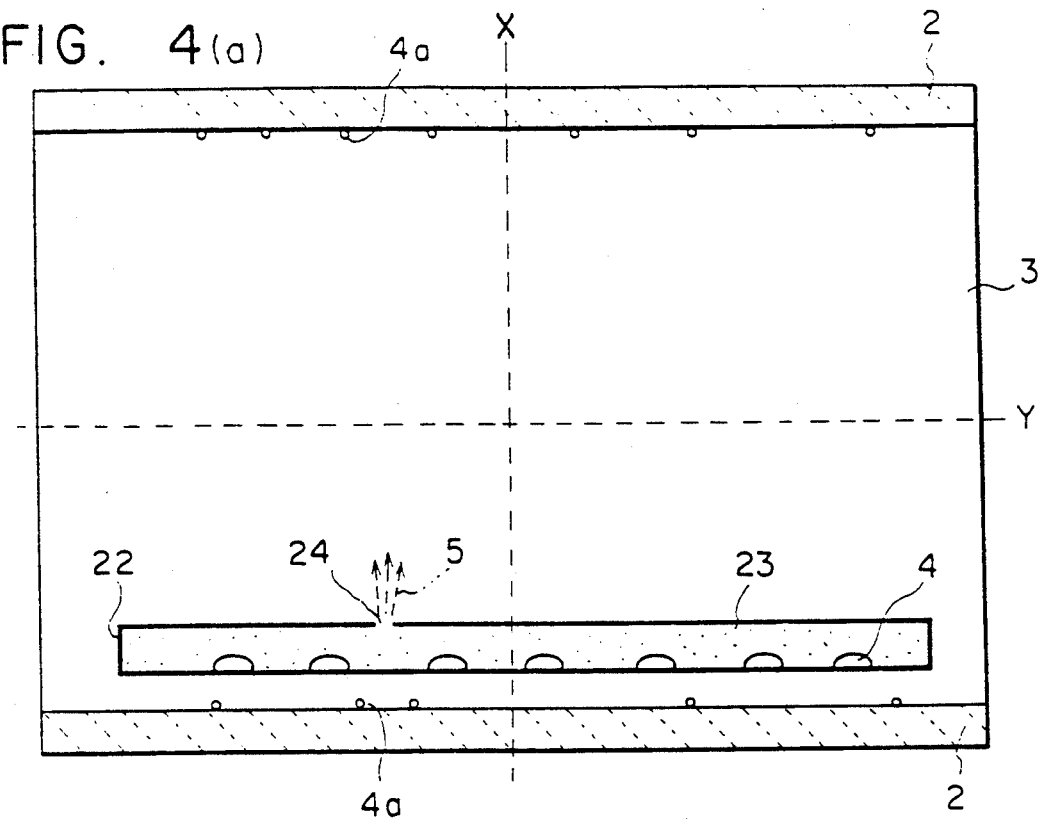
FIGS. 4(a) and 4(b) are sectional views showing an essential portion of a substance vaporizing apparatus in a first embodiment according to the present invention.
Figure 4B:
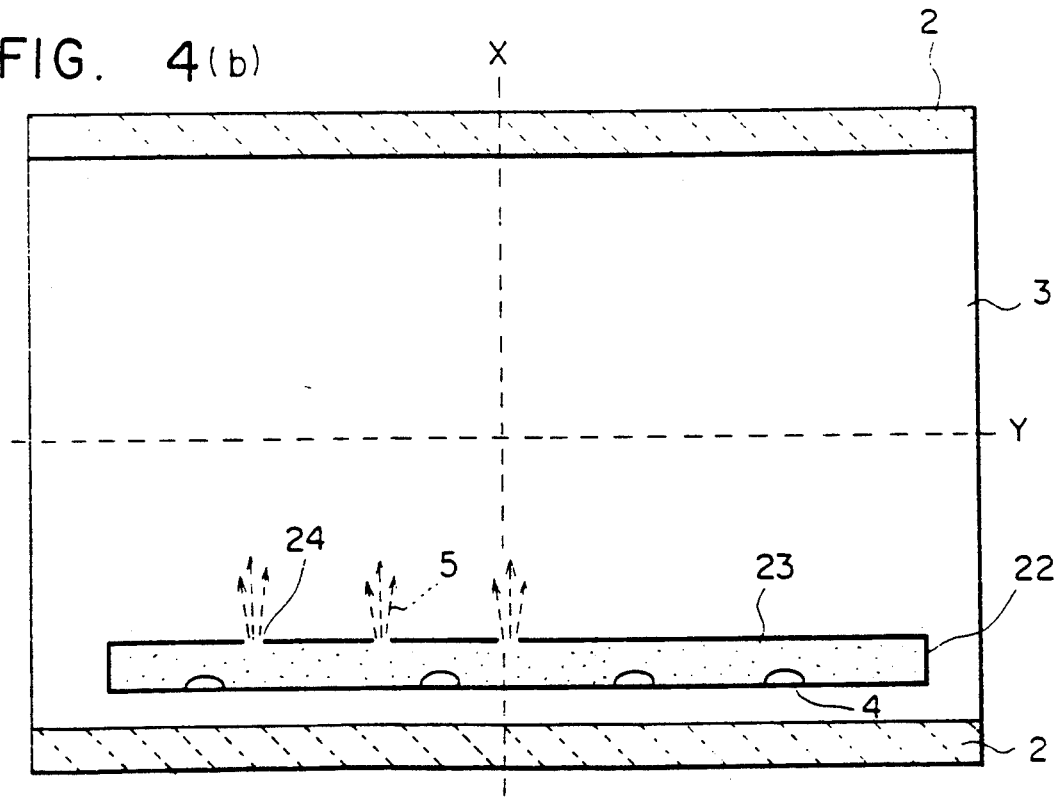

Shown in FIGS. 4(a) and 4(b) are a discharge tube 2, a discharge space 3, metal pieces 4, such as copper or gold pieces, a metal vapor 5 of the metal emitted into the discharge space 3, a tubular container 22 formed of a heat-resistant material, such as a ceramic, tungsten or molybdenum, a vapor reserving space 23, and a through hole 24 (FIG. 4(a) or through holes 24 (FIG. 4(b)) formed in the wall of the container 22. In FIGS. 4(a) and 4(b), the X-axis and the Y-axis represent the diametrical direction and axial direction of the discharge space 3, respectively. The rest of the components of the substance vaporizing apparatus are similar to those of the metal vapor laser shown in FIG. 1.

The operation of the substance vaporizing apparatus for use as, for example, a metal vapor laser will be described hereinafter.

A voltage is applied across the electrodes 1a and 1b to form a discharge in the discharge space filled with a buffer gas. The buffer gas heated by the discharge heats metal particles 4a adhering to the inner surface of the discharge tube 2, and the metal pieces 4 contained in the container 22. Then, the metal particles 4a are vaporized in the discharge space 3 at a vaporizing rate dependent on the surface temperature of the metal particles 4a. The vapor generated in the container 22 by heating the metal pieces 4 fills up the vapor reserving space 23 and is emitted into the discharge space 3 through the through hole 24 (FIG. 4(a)) or through holes 24 (FIG. 4(b)). Since the vapor is emitted into the discharge space 3 only through the through hole 24 (or through holes 24) at a controlled rate. The vapor density in the discharge space 3 is maintained below a saturation vapor density dependent on the temperature of the buffer gas.

Figure 5A:
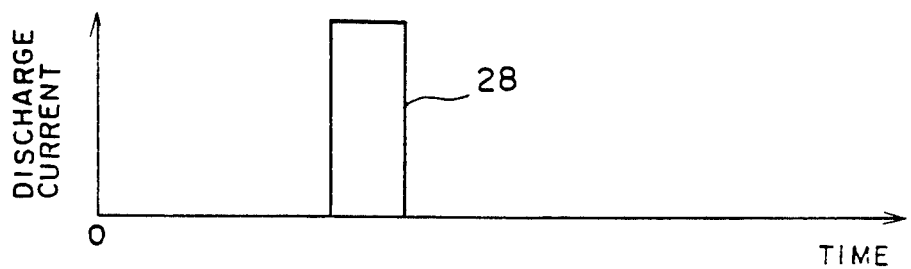
Figure 5B:
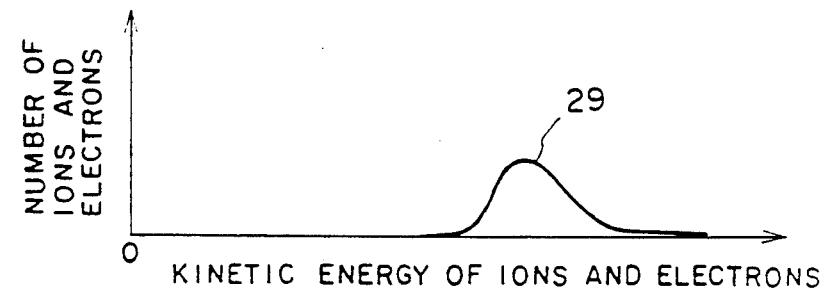
Figure 5C:
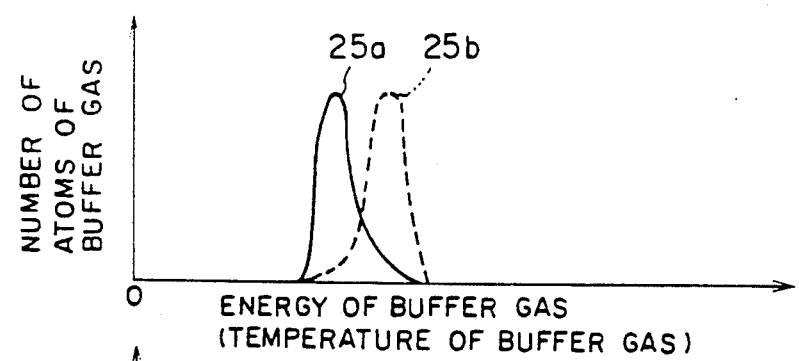
Figure 5D:
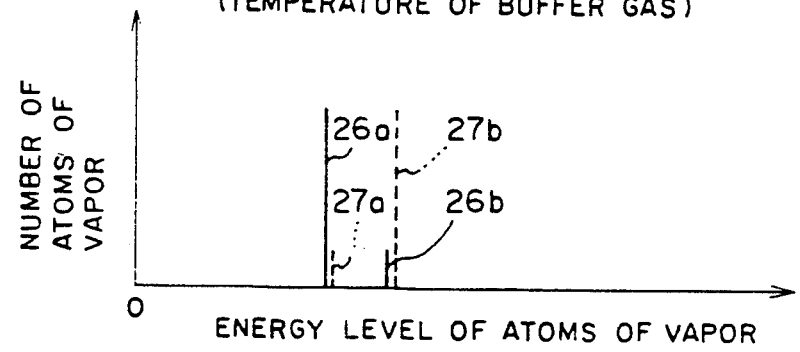

FIGS. 5(a) to 5(d) are graphs of assistance in explaining the laser oscillation of a metal vapor laser. FIG. 5(a) shows the waveform of discharge current, in which time t is measured on the horizontal axis and discharge current is measured on the vertical axis. FIG. 5(b) shows the distribution of the kinetic energy Pe of ions and electrons (the temperature of ions and electrons), in which the kinetic energy Pe of ions and electrons is measured on the horizontal axis and the number Ne of ions and electrons is measured on the vertical axis. FIG. 5(c) shows the distribution of the energy Pg of the buffer gas (the temperature of the buffer gas), in which the energy of the buffer gas is measured on the horizontal axis and the number Ng of atoms of the buffer gas is measured on the vertical axis. FIG. 5(d) shows the distribution of the energy level Pj of atoms of the vapor, in which the energy level of the atoms of the vapor is measured on the horizontal axis and the number Nj of the atoms of the vapor is measured on the vertical axis. In FIGS. 5(a) to 5(d), indicated at 28 is the waveform of the pulse current, at 29 is a Pe distribution curve, at 25a is a Pg distribution curve, at 25b is a Pg distribution curve, at 26a and 27a are the numbers of the atoms of the vapor on a lower energy level, and at 26b and 27b are the numbers of the atoms of the vapor on a higher energy level.

As shown in FIG. 5(a), a discharge of the pulse current 28 is formed in the buffer gas prevailing in the discharge space. Ions and electrons of the atoms of the buffer gas produced by ionization in the discharge space are accelerated by an electric field E created in the discharge space and acquire the kinetic energy Pe. The ions and electrons of the atoms of the buffer gas having the kinetic energy Pe collide against the atoms of the buffer gas to transfer the energy to the atoms of the buffer gas and, consequently, the energy of the ions and electrons shows a distribution as shown in FIG. 5(b). The kinetic energy Pe is a function of the intensity of the electric field E and the mean free path $l_{eg}$ namely, the average distance traveled by the ions and electrons before colliding against the atoms of the buffer gas. The mean kinetic energy is designated generally as the electron temperature Te.

The energy Pg of the atoms of the buffer gas acquired from the ions and electrons has a distribution represented by a curve 25a in FIG. 5(c). The energy Pg is a function of the kinetic energy Pe of the ions and electrons and the means free path $l_{gj}$ of the atoms of the vapor. The mean energy is designated generally as the gas temperature Tg.

The atoms of the vapor are energized to higher and lower energy levels by the collision of the ions, electrons and atoms of the buffer gas against the atoms of the vapor. A population inversion of the atoms of the vapor, namely, the higher population of the atoms of the higher energy level than the atoms of the lower energy level, causes laser oscillation.

While the pulse discharge is stopped, ions and electrons disappear and the energy of the buffer gas is transferred to the discharge tube 2 by diffusion and hence the gas temperature Tg drops.

Since laser oscillation is thus caused, the mean free path $l_{gj}$ increases, and the gas temperature Tg and the electron temperature Te during the duration of the pulse discharge increases when the density of the metal vapor is suppressed, so that the number of atoms on the higher energy level increases relative to the number of atoms on the lower energy level to enhance the laser output.

Accordingly, the metal vapor generated within the container 22 is emitted into the discharge space 3 through the through hole 24 (FIG. 4(a)) or through holes 24 (FIG. 4(B)) having a limited diameter to suppress the density of the metal vapor below the saturation vapor density dependent on the temperature of the buffer gas, whereby the density of the metal vapor in the discharge space 3 is maintained at a low value, namely, the number of atoms of the higher energy level is increased to enhance the laser output. Thus, the efficiency, quality and function of the metal vapor laser are enhanced.

SECOND EMBODIMENT

Figure 6A:
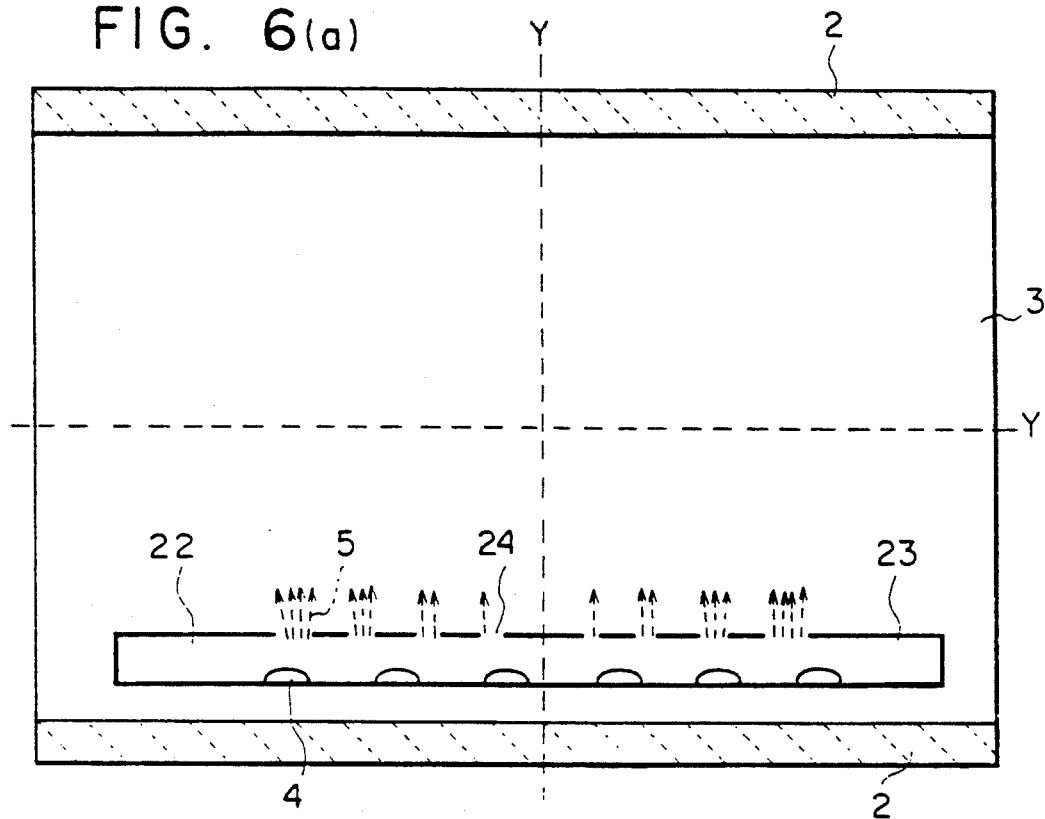
FIGS. 6(a) and 6(b) are sectional views of an essential portion of a substance vaporizing apparatus in a second embodiment according to the present invention.
Figure 6B:
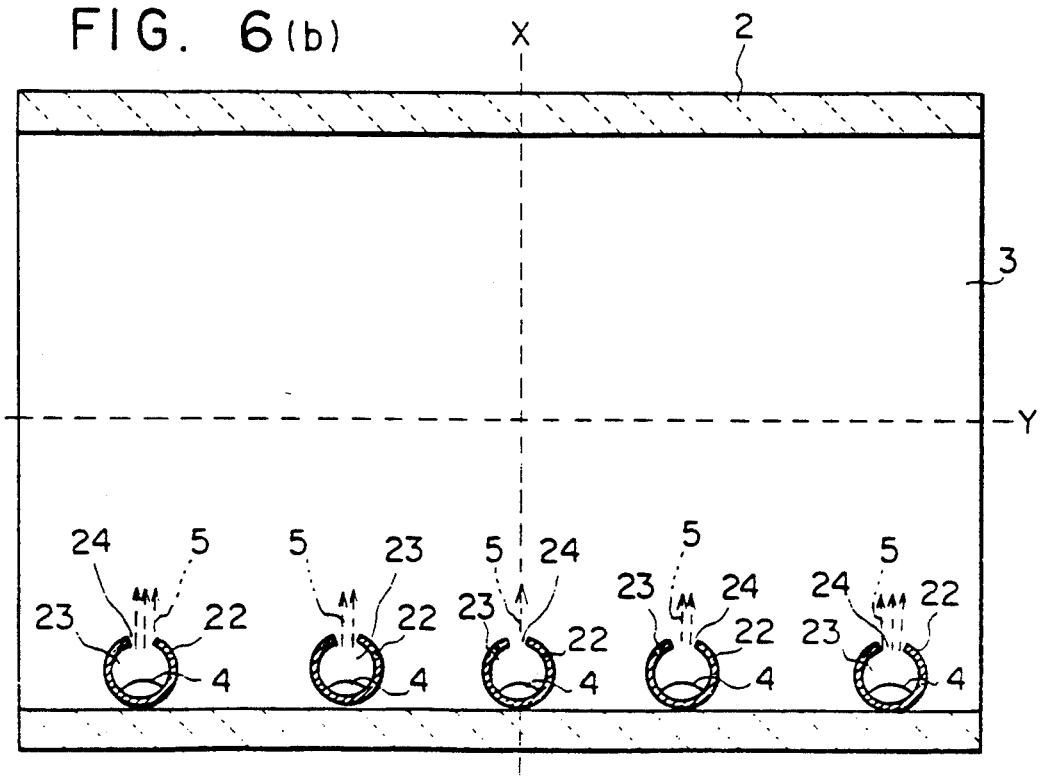

Shown in FIGS. 6(a) and 6(b) is a substance vaporizing apparatus in a second embodiment according to the present invention.

In a construction shown in FIG. 6(a), the substance vaporizing apparatus is provided with a container 22 provided with a plurality of through holes 24. The diameters of the through holes 24 nearer to the opposite ends of a discharge tube 2 are greater than those of the through holes 24 nearer to the middle of the discharge tube 2. For example, the diameter of the through hole 24 at the middle of the container 22 is on the order of 0.5 mm, and that of the through hole 24 adjacent to the extremity of the container 22 is on the order of 2 mm. Therefore, the metal vapor emitting rate per unit length of the container 22 is lower in the middle portion of the discharge space 3 than in the end portions of the discharge space 3 where the gas temperature Tg gas is lower than that in the middle portion. Thus, the vapor density is distributed uniformly with respect to the axial direction of the discharge space 3, so that the laser oscillation efficiency per unit length is enhanced. The second embodiment has been described on an assumption that the gas temperature Tg in the middle portion of the discharge space 3 is the highest, but a portion where the gas temperature Tg is the highest is not necessarily the middle portion depending on the construction of the substance vaporizing apparatus and the mode of pulse discharge. In such a case, the distribution of the metal vapor emitting rate per unit length may be changed according to the axial distribution of the gas temperature Tg in the discharge tube 2.

In a construction shown in FIG. 6(b), the substance vaporizing apparatus is provided with a plurality of spherical containers 22 respectively having through holes 24 of different diameters. The spherical containers 22 are arranged so that the metal vapor is emitted into the end portions of the discharge space 3 at a higher emitting rate per unit length and into the middle portion of the discharge space 3 at a lower emitting rate per unit length. It is also possible to distribute spherical containers 22 provided respectively with through holes 24 of the same diameter so that the density of the through holes 24 increases toward the opposite ends of the discharge space 3. Annular containers may be used instead of the spherical containers 22. The annular containers emit the metal vapor into the circumference of the discharge space 3.

Figure 7A:
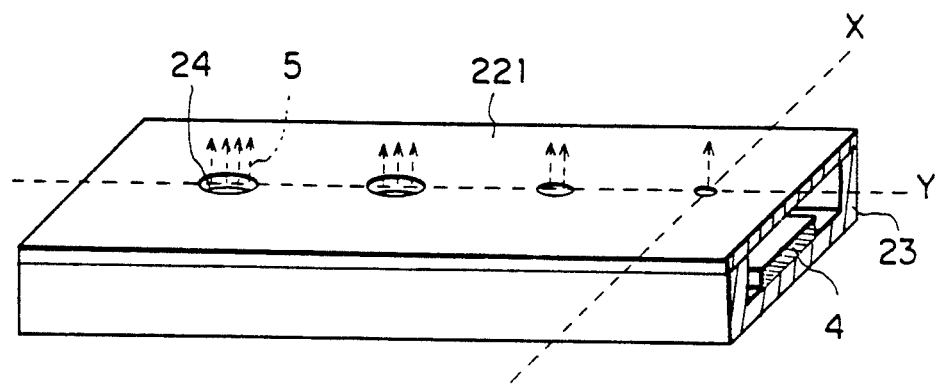
FIGS. 7(a) and 7(b) are perspective views respectively showing modifications of the substance vaporizing apparatus in the second embodiment according to the present invention.
Figure 7B:
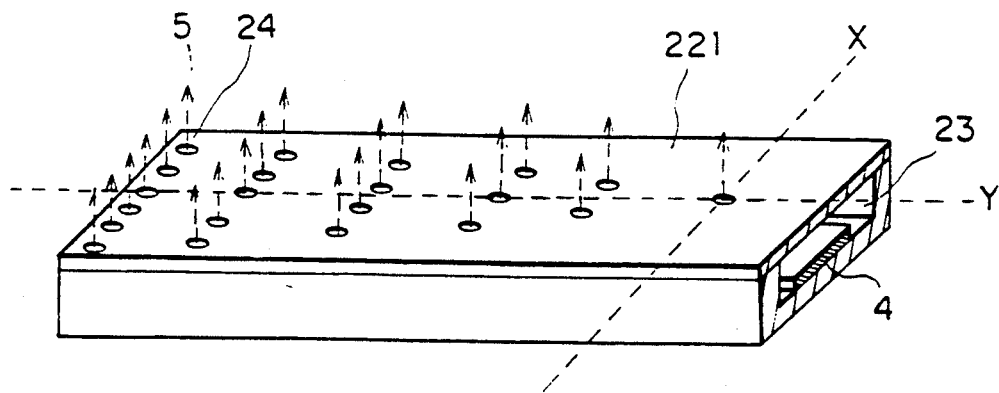

Shown in FIGS. 7(a) and 7(b) are modifications of the container employed in the substance vaporizing apparatus in the second embodiment. A container 221 shown in FIG. 7(a) has the shape of a box and is provided with a plurality of through holes 24 differing from each other in diameter. The diameters of the through holes 24 nearer to the opposite ends of the container 221 are greater than those of the through holes 24 nearer to the middle of the container 221. A container 221 shown in FIG. 7(b) is provided with a plurality of through holes 24 of the same diameter. The density of the through holes 24 is increased with axial distance from a predetermined axial position in the discharge tube 2. These modifications are the same in effect as the container 22 employed in the substance vaporizing apparatus in the second embodiment. The second embodiment and its modifications has an effect, in addition to that of the first embodiment, of increasing the space utilization efficiency, enabling the substance vaporizing apparatus to be formed in a compact construction and enhancing the output of the substance vaporizing apparatus.

THIRD EMBODIMENT

Figure 8:
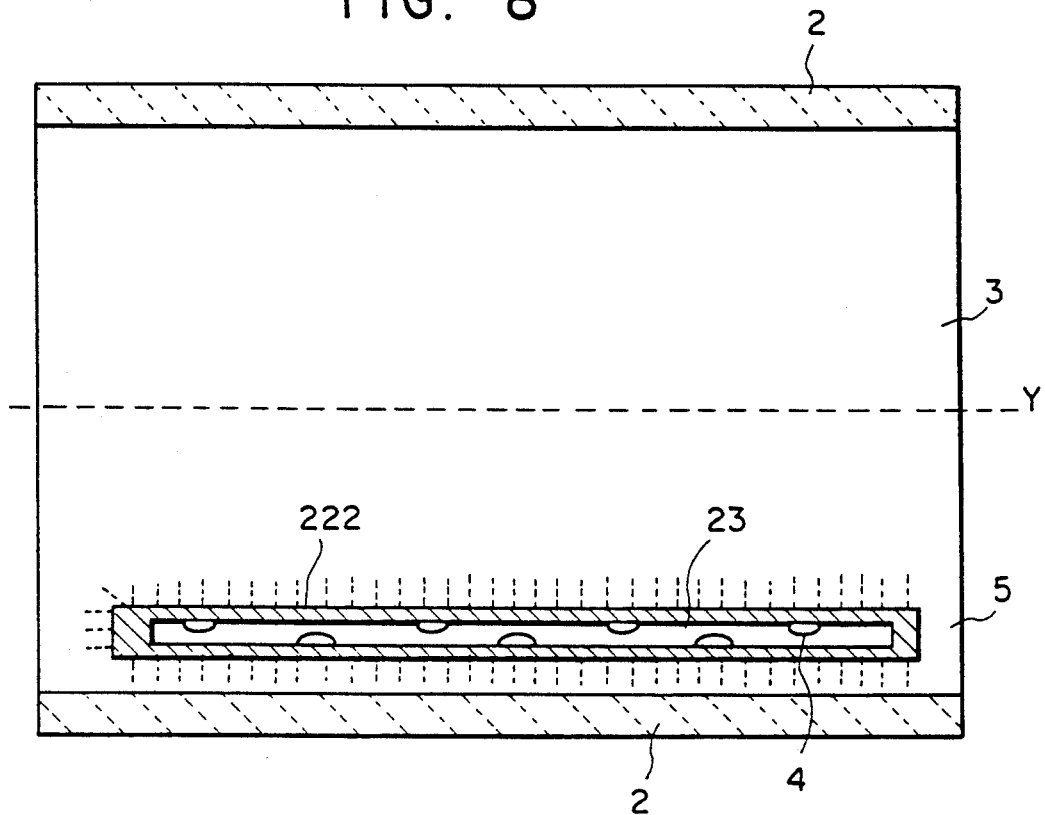
FIG. 8 is a sectional view of an essential portion of a substance vaporizing apparatus in a third embodiment according to the present invention.
Figure 9:
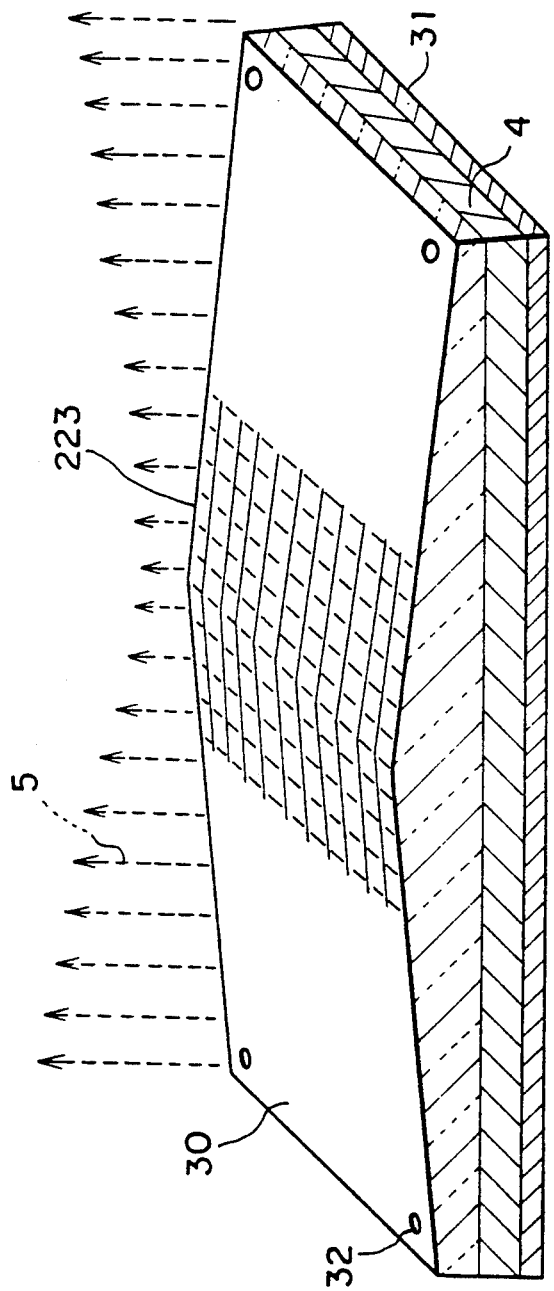
FIG. 9 is a perspective view of a porous member employed in the substance vaporizing apparatus in the third embodiment according to the present invention.

Referring to FIGS. 8 and 9, a substance vaporizing apparatus in a third embodiment according to the present invention comprises a gas-filled discharge tube 2 defining a discharge space 3, and a container 222 formed of a porous material, such as a porous ceramic, and provided within the discharge tube 2. A vapor generated in the container 222 is emitted from the container 222 through pores into the discharge space 3. The metal vapor emitting rate is suppressed by using a porous ceramic material having an appropriate pore density. Thus, the vapor is emitted in a uniform density distribution into the discharge space 2, so that the laser output is enhanced.

Referring to FIG. 9, a laminated porous sheet 223 is formed by laminating a meshed or porous sheet 30, a metal sheet 4 and a substrate 31 in that order, and fastening the sheet 30 and the metal sheet 4 to the substrate 31 with pins 32. The laminated porous sheet 223 is wound in a tubular shape with the porous sheet 30 inside so as to surround the discharge space 3. The vapor 5 of the metal sheet 4 is emitted through the porous sheet 30 into the discharge space 3. The porous sheet 223 has pores formed therein in a small pore density to suppress the vapor emitting rate. The substrate 31 may be formed so as to function as a discharge tube 2 as well as the substrate proper. The container of the third embodiment has the effect of the first and second embodiments.

FOURTH EMBODIMENT

Figure 10:
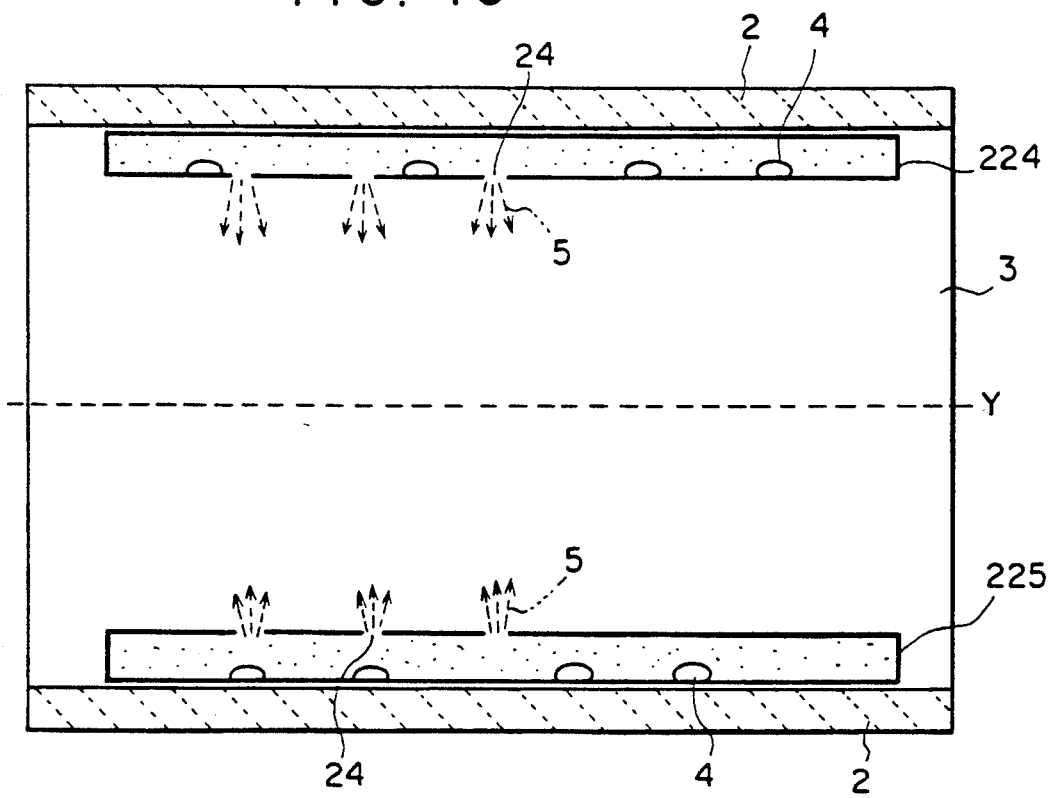
FIG. 10 is a sectional view of an essential portion of a substance vaporizing apparatus in a fourth embodiment according to the present invention.

FIG. 10 shows a substance vaporizing apparatus in a fourth embodiment according to the present invention. As shown in FIG. 10, the substance vaporizing apparatus comprises a discharge tube 2 defining a discharge space 3, and a plurality of tubular containers 224 and 225 disposed in the periphery of the discharge space 3 and provided with through holes 24. Metal vapors 5 generated in the containers 224 and 225 are emitted radially inward through the through holes 24 into the discharge space 3. The vapor density in the discharge space is adjusted properly and the vapor is emitted into the discharge space 3 in a uniform vapor density distribution by selectively determining the respective diameters of the through holes 24. The containers 224 and 225 may be substituted by the laminated porous sheet employed in the third embodiment. Since the metal vapor is supplied from the periphery of the discharge space 3 so that the metal vapor can uniformly be distributed in the central region of the discharge space 3. The vapor emitting rate can be adjusted by selectively determining the respective diameters of the through holes 24, so that the efficiency of utilization can be increased and the substance vaporizing apparatus can be formed in a compact construction.

FIFTH EMBODIMENT

Figure 11:
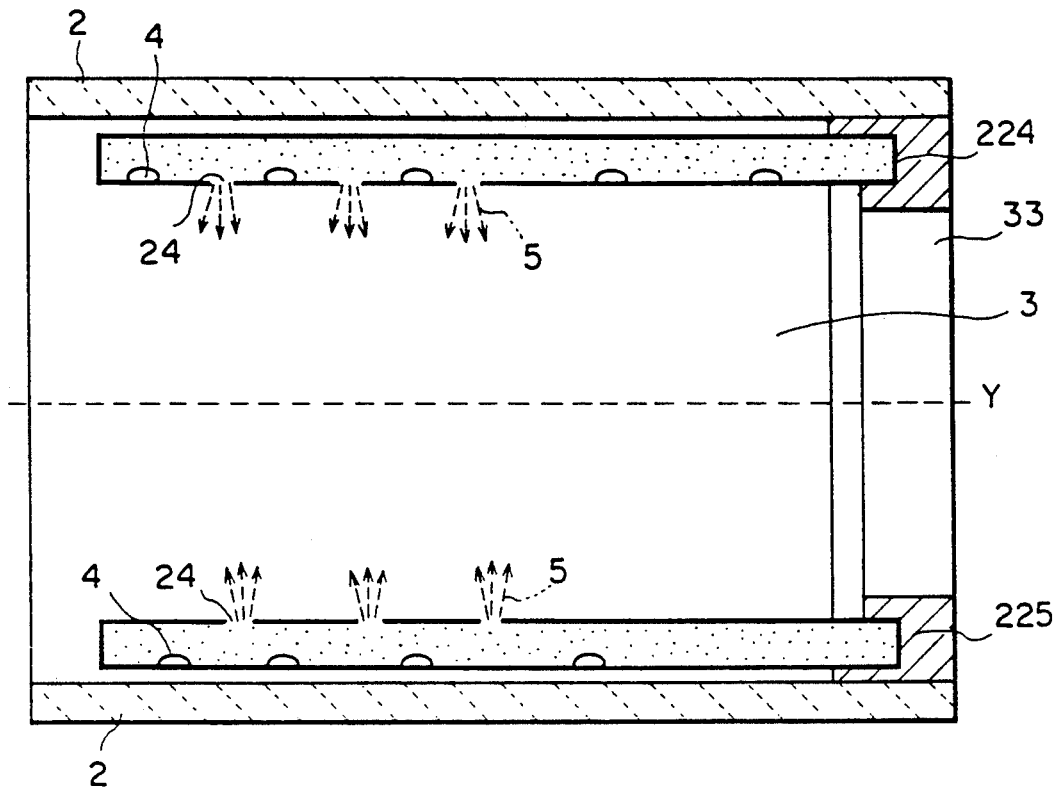
FIG. 11 is a sectional view of an essential portion of a substance vaporizing apparatus in a fifth embodiment according to the present invention.
Figure 12:
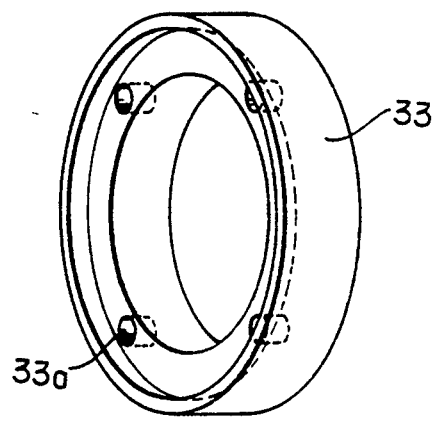
FIG. 12 is a perspective view of a ring employed in the substance vaporizing apparatus in the fifth embodiment according to the present invention.

FIG. 11 shows a substance vaporizing apparatus in a fifth embodiment according to the present invention. This substance vaporizing apparatus comprises a discharge tube 2 defining a discharge space 3, a plurality of containers 224 and 225, and a holding ring 33 for fixedly holding the containers 224 and 225 in the discharge space 3. As shown in FIG. 11, the holding ring 33 is formed of a heat-resistant material, such as a ceramic, molybdenum or tungsten, and is fitted in one end of the discharge tube 2. As shown in FIG. 12, the holding ring 33 is provided with, for example, four holes 33a in which the plurality of containers 224 and 225 are fitted. The holding ring 33 fixedly holding the containers 224 and 225 in the end of the discharge tube 2 to disposed the containers 224 and 225 at desired positions within the discharge space 3 so that the efficiency of utilization is increased. Thus, the substance vaporizing apparatus is able to operate at an improved efficiency.

SIXTH EMBODIMENT

Figure 13:
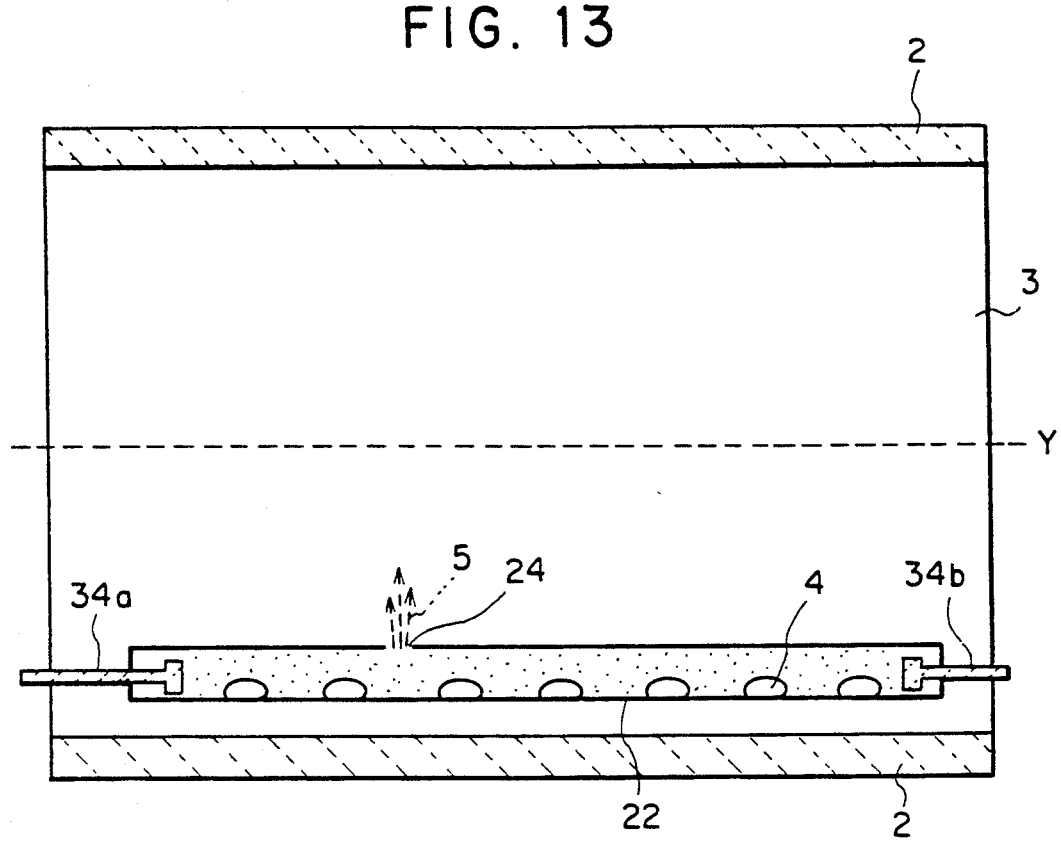
FIG. 13 is a sectional view of an essential portion of a substance vaporizing apparatus in a sixth embodiment according to the present invention.

FIG. 13 shows a substance vaporizing apparatus in a sixth embodiment according to the present invention. This substance vaporizing apparatus comprises a discharge tube 2 defining a discharge space 3, a container 22 disposed within the discharge space 3, and auxiliary electrodes 34a and 34b provided within the container 22. A voltage is applied across the auxiliary electrodes 34a and 34b to form a discharge for heating a metal pieces 4 contained in the container 22. Thus, the metal pieces 4 are vaporized at an increased vaporizing rate to increase the gas pressure within the container 22, the vapor emitting rate is varied with time by controlling the discharge, and the vapor density in the discharge space 3 is controlled in synchronism with the pulse output, namely, with the laser oscillation, to increase the peak pulse output. In the sixth embodiment, the vapor generating rate and the vapor generating timing can be controlled, so that the efficiency of utilization is increased and the output can be controlled.

Although the foregoing embodiments have been described as applied to a metal vapor laser, the present invention is applicable also to a vapor ion beam apparatus and the like.

SEVENTH EMBODIMENT

Figure 14:
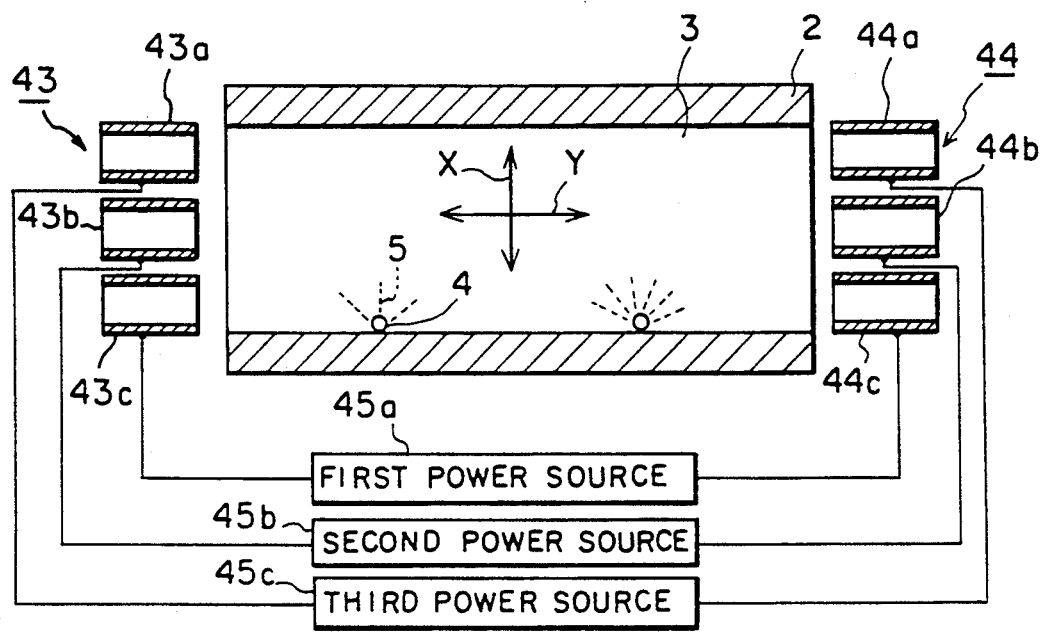
FIG. 14 is a sectional view of an essential portion of a substance vaporizing apparatus in a seventh embodiment according to the present invention.

FIG. 14 shows a substance vaporizing apparatus in a seventh embodiment according to the present invention as applied to a metal vapor laser, in which parts like or corresponding to those previously described with reference to FIG. 11 are denoted by the same reference characters and the description thereof will be omitted to avoid duplication.

Referring to FIG. 14, a pair of electrodes 43 and 44 are disposed axially opposite to each other with respect to the axial direction indicated by arrows Y in a discharge space 3. The electrode 43 consists of a plurality of partial electrodes 43a, 43b and 43c electrically insulated from each other and arranged diametrically of the discharge space 3 (along a direction indicated by arrows X) at intervals, and the electrode 44 consists of a plurality of partial electrodes 44a, 44b and 44c electrically insulated from each other and arranged diametrically of the discharge space 3 at intervals. A plurality of power sources 45a, 45b and 45c apply voltages across the partial electrodes 43a and 44a, across the partial electrodes 43b and 44b and across the partial electrodes 43c and 44c, respectively.

In operation, pulse voltages are applied across the partial electrodes 43a and 44a, across the partial electrodes 43b and 44b and across the partial electrodes 43c and 44c, respectively, to form a plurality of diametrically separate pulse discharges in the discharge space 3 to melt and vaporize metal pieces 4 provided in the discharge space 3 to generate a metal vapor. Laser light is produced by exciting the metal vapor to a higher energy level by the plurality of pulse discharges. Since the pulse discharges are formed in the diametrically divided regions of the discharge space 3, the buffer gas prevailing in the discharge space 3 is heated uniformly with respect to the diametrical direction, so that the diametrical temperature distribution of the buffer gas is substantially uniform. Thus, the length and diameter of the laser medium can be increased and the laser output can be enhanced. Increase in the time interval of laser oscillation in unit time interval by the plurality of pulse discharges formed in the discharge space 3 enhances the laser output.

Figure 15:
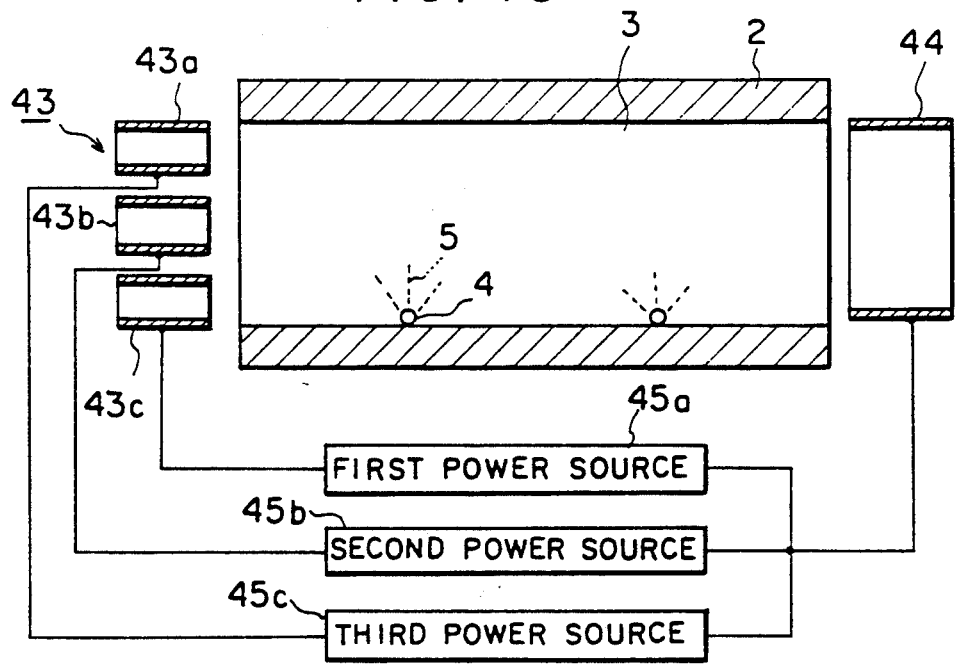
FIG. 15 is a sectional view of an essential portion of a modification of the substance vaporizing apparatus in the seventh embodiment according to the present invention.

FIG. 15 shows a modification of the substance vaporizing apparatus in the seventh embodiment. The substance vaporizing apparatus shown in FIG. 15 comprises a pair of electrodes 43 and 44, and only the electrode 43 consists of a plurality of partial electrodes 43a, 43b and 43c. The effect of the substance vaporizing apparatus shown in FIG. 15 is substantially the same as that of the substance vaporizing apparatus shown in FIG. 14.

EIGHTH EMBODIMENT

Figure 16:
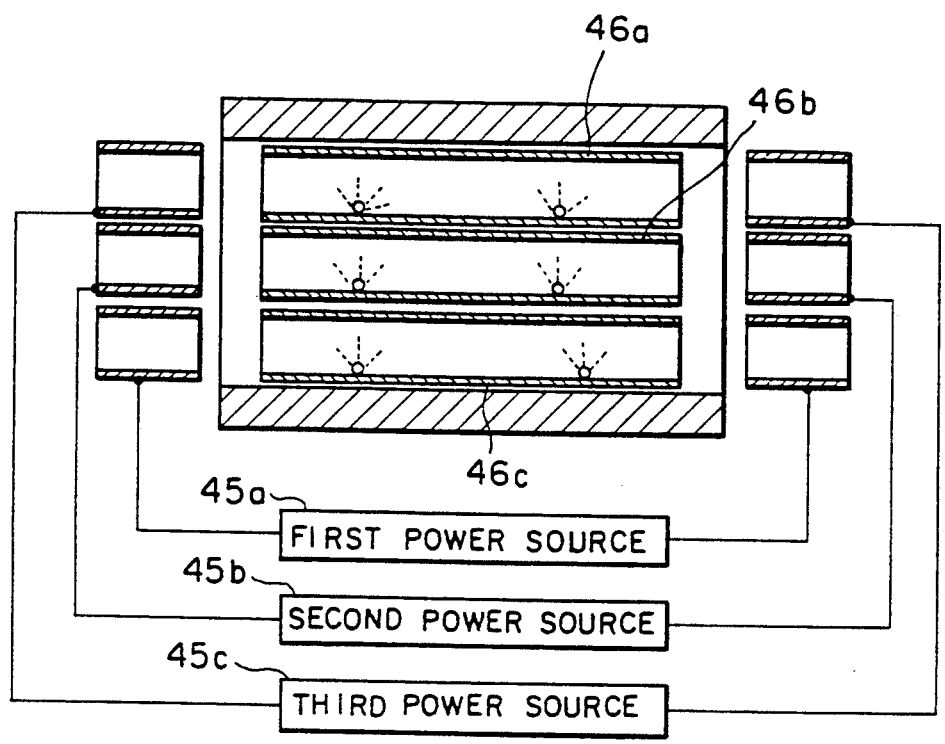
FIG. 16 is a sectional view of an essential portion of a substance vaporizing apparatus in an eighth embodiment according to the present invention.

FIG. 16 shows a substance vaporizing apparatus in an eighth embodiment according to the present invention. This substance vaporizing apparatus comprises an electrode 43 consisting of a plurality of partial electrodes 43a, 43b and 43c, an electrode 44 consisting of a plurality of partial electrodes 44a, 44b and 44c, a plurality of tubular containers 46a, 46b and 46c extended within a discharge space 3 substantially in parallel to the axial direction of the discharge space 3, namely, a direction indicated by arrows Y, between the partial electrodes 43a and 44a, between the partial electrodes 43b and 44b and between the partial electrodes 43c and 44c, respectively, and a plurality of power sources 45a, 45b and 45c for applying voltages across the partial electrodes 43a and 44a, across the partial electrodes 43b and 44b and across the partial electrodes 43c and 44c.

Figure 17:
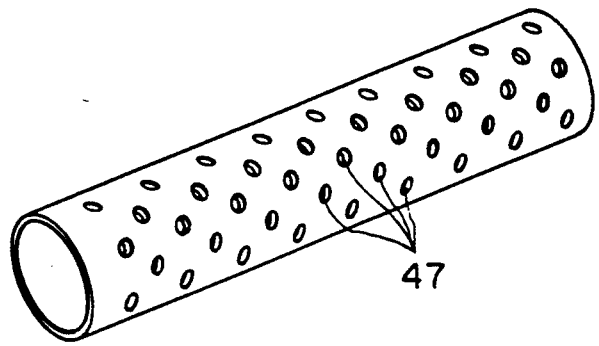
FIG. 17 is a perspective view of a preferred tube for a substance vaporizing apparatus.

Preferably, the plurality of containers 46a, 46b and 46c are provided with a plurality of projections or holes 47 in their circumferences as shown in FIG. 17 or are formed of a porous material.

The substance vaporizing apparatus in the eighth embodiment has the following effect in addition to that of the substance vaporizing apparatus in the seventh embodiment. The atoms excited to a lower energy level, which are the factor suppressing laser output enhancement, collide against the plurality of containers and the energy level of the atoms drops rapidly from the lower energy level to the ground energy level to promote the reduction of the number of atoms excited to the lower energy level.

The plurality of containers 46a, 46b and 46c provided with the plurality of projections or holes 47 in their circumferences or formed of the porous material causes convection within the discharge space 3 to make substantially uniform the temperature distribution of the buffer gas and the density distribution of the vapor in the discharge space 3. Consequently, laser radiations of substantially uniform qualities in peak value and directivity are generated respectively in regions between the partial electrodes 43a and 44a, between the partial electrodes 43b and 44b and between the partial electrodes 43c and 44c.

NINTH EMBODIMENT

Figure 18:
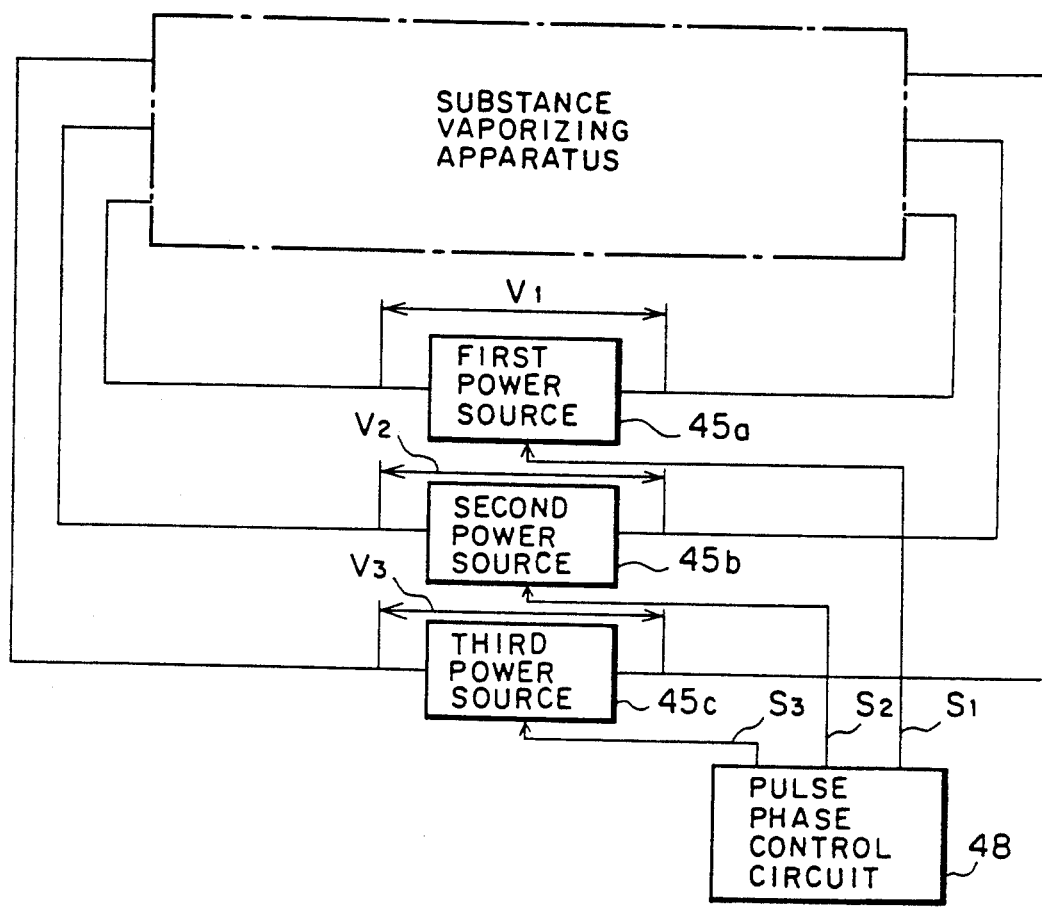
FIG. 18 is a block diagram of an essential portion of a substance vaporizing apparatus in a ninth embodiment according to the present invention.

FIG. 18 shows a substance vaporizing apparatus in a ninth embodiment according to the present invention. This substance vaporizing apparatus comprises an electrode 43 consisting of a plurality of partial electrodes 43a, 43b and 43c, an electrode 44 consisting of a plurality of partial electrodes 44a, 44b and 44c, a first power source 45a, a second power source 45b and a third power source 45c for applying voltages across the partial electrodes 43a and 44a, across the partial electrodes 43b and 44b and across the partial electrodes 43c and 44c, respectively, and a pulse phase controller 48 connected to the power sources 45a, 45b and 45c.

Figure 19:
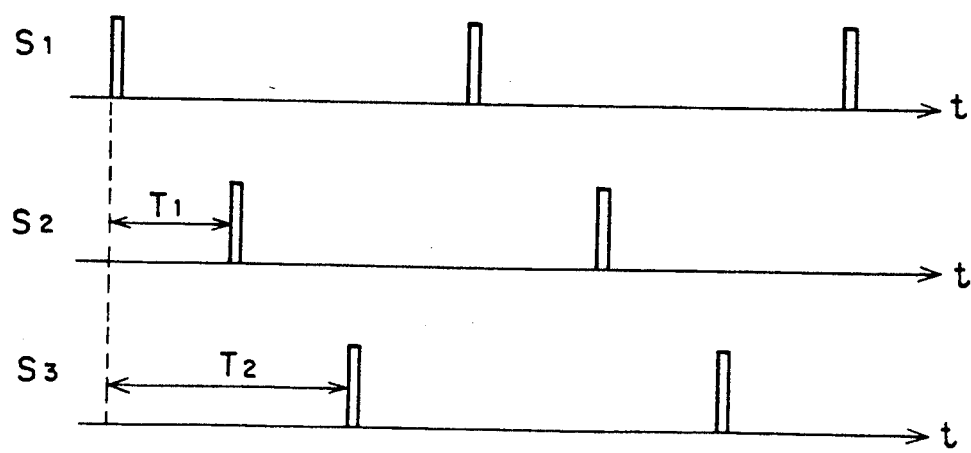
FIG. 19 is a waveform chart showing the waveforms of pulse signals generated by a pulse phase controller incorporated into a substance vaporizing apparatus.

The pulse phase controller 48 applies pulse signals $S_1$, $S_2$ and $S_3$ to the power sources 45a, 45b and 45c to make the power sources 45a, 45b and 45c apply pulse voltages respectively to the corresponding pairs of the partial electrodes 43a and 44a, 43b and 44b, and 43c and 44c. As shown in FIG. 19, the pulse signal $S_2$ applied to the second power source 45b lags the pulse signal $S_1$ applied to the first power source 45a by a time $T_1$, and the pulse signal $S_3$ applied to the third power source 45c lags the pulse signal $S_1$ applied to the first power source 45 a by a time $T_2$. Consequently, the phase of the pulse voltage applied across the pair of partial electrodes 43b and 44b lags the phase of the pulse voltage applied across the pairs of partial electrodes 43a and 44a by the time $T_1$, and the phase of the pulse voltage applied across the partial electrodes 43c and 44c lags the phase of the voltage pulse applied across the pair of partial electrodes 43a and 44a by the time $T_2$.

Thus, the substance vaporizing apparatus in the ninth embodiment has the following effect in addition to that of the substance vaporizing apparatus in the seventh embodiment. That is, the pulse voltages of different phases are applied sequentially across the pairs of partial electrodes 43a and 44a, 43b and 44b, and 43c and 44c to form pulse discharges of different phases sequentially in diametrically divided regions in the discharge space, respectively, so that the energy level of the atoms of the vapor excited to a higher energy level by a pulse discharge drops from the higher energy level to a lower energy level to increase the number of atoms on the lower energy level. The energy level of the atoms on the lower energy level is allowed to drop to the ground energy level during the interruption of pulse discharge and hence the number of atoms on the lower energy level can be reduced, so that the laser output is enhanced.

Tenth Embodiment

Figure 3:
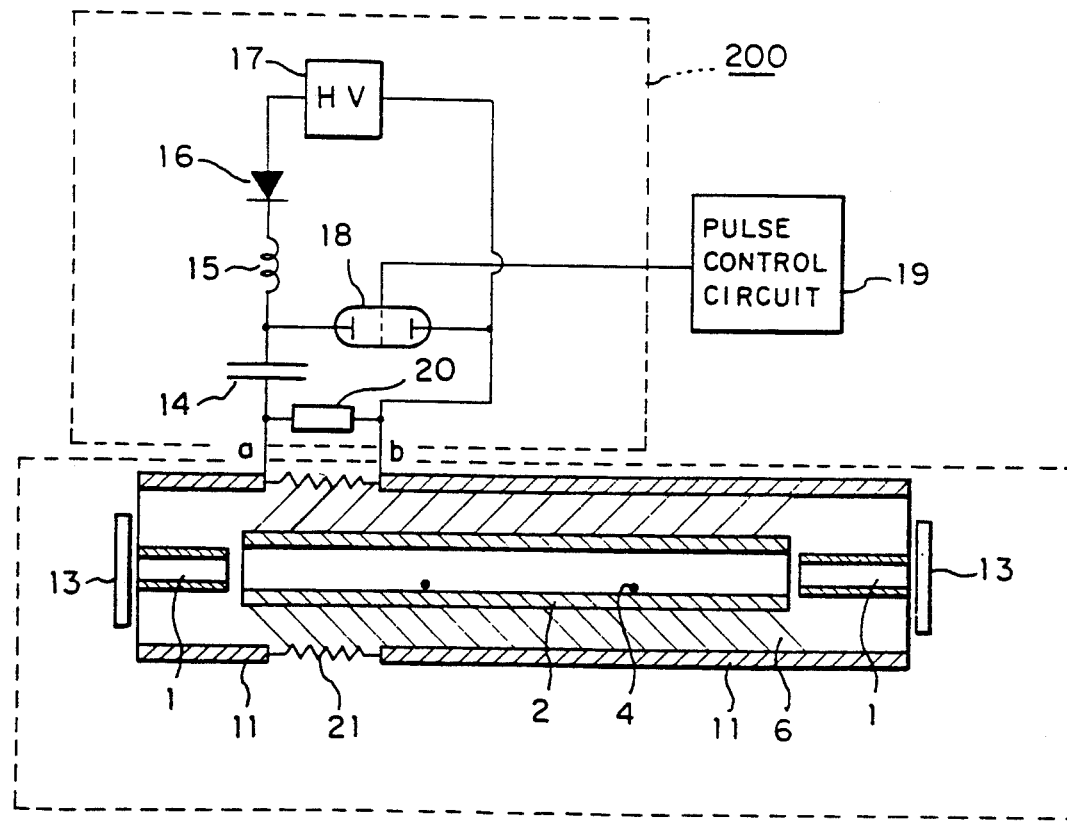
FIG. 3 is a diagrammatic illustration of a conventional copper vapor laser.
Figure 20:
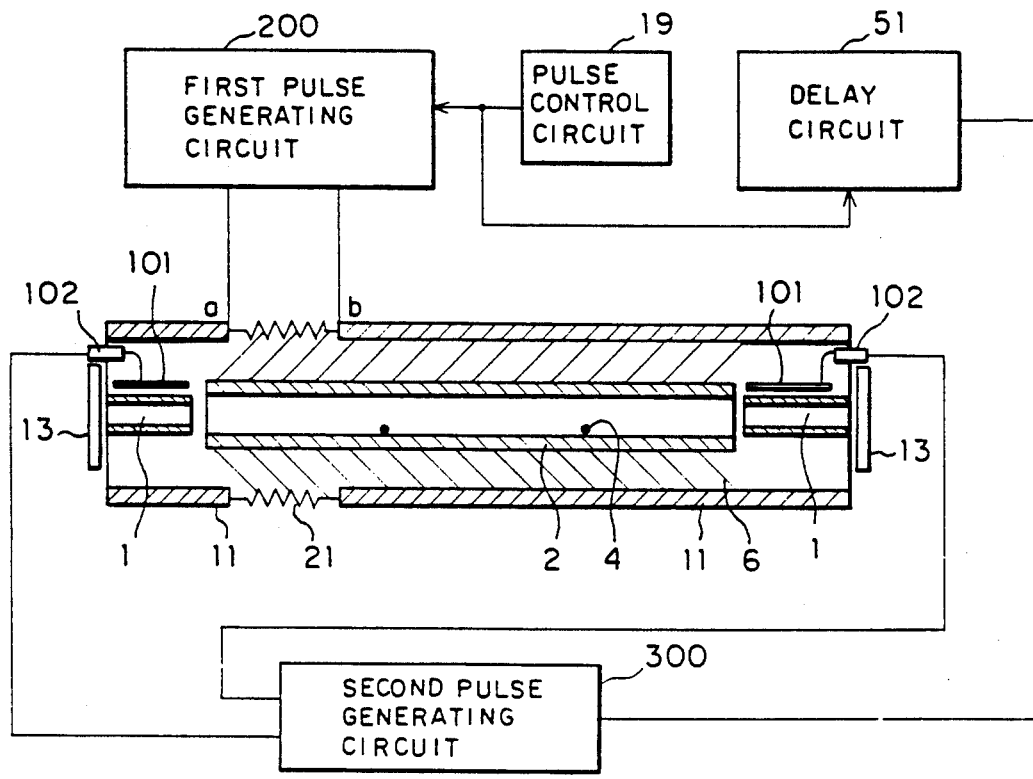
FIG. 20 is a block diagram of a substance vaporizing apparatus in a tenth embodiment according to the present invention, as a metal vapor laser.

FIG. 20 shows a substance vaporizing apparatus in a tenth embodiment according to the present invention, in which parts like or corresponding to those previously described with reference to FIG. 3 are denoted by the same reference characters and the description thereof is omitted to avoid duplication.

Figure 21A:
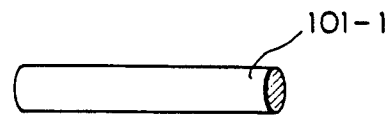
FIGS. 21(a), 21(b) and 21(c) are perspective views of auxiliary electrodes.
Figure 21B:
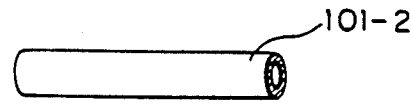
Figure 21C:
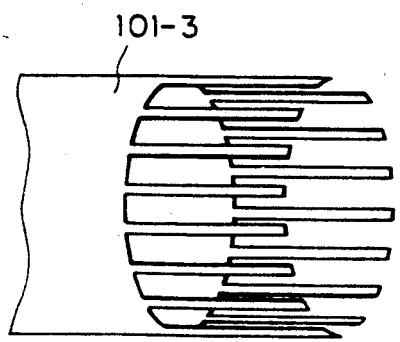

Referring to FIG. 20, a delay circuit 51 has the input connected to a pulse control circuit 19, and the output connected to a second pulse generating circuit 300. The delay circuit 51 delays the output signal by a specified time interval with respect to an input signal from the pulse control circuit 19. The output of the second pulse generating circuit 300 is connected through insulated rings 102 to auxiliary electrodes 101 disposed opposite to electrodes 1 provided at the opposite ends of a discharge tube 2, respectively. The auxiliary electrodes 101 have each a small surface area to form a stable discharge at a fixed discharge position. The auxiliary electrodes 101 may be, for example, a solid rod 101-1 of a small diameter as shown in FIG. 21(a), a tube 101-2 having a small outside diameter as shown in FIG. 21(b) or a cylindrical comb 101-3 as shown in FIG. 21(c).

Figure 22:
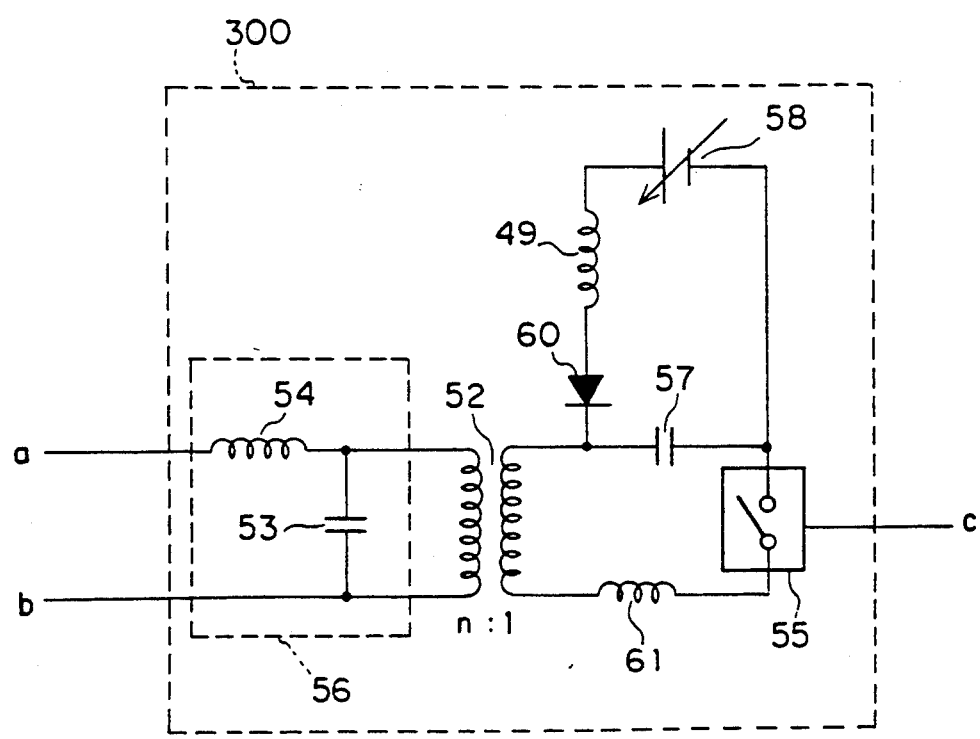
FIG. 22 is a circuit diagram of a second pulse generating circuit shown in FIG. 20.

Referring to FIG. 22 showing the configuration of the second pulse generating circuit 300 shown in FIG. 20 in detail, a connecting line a is connected through a filter reactor 54 to one end of the secondary coil of a pulse transformer 52 of a turns ratio n. A connecting line b is connected to the other end of the secondary coil of the pulse transformer 52. A filter capacitor 53 is connected in parallel to the secondary coil of the pulse transformer 52. The filter capacitor 53 and the filter reactor 54 constitute a protective circuit 56.

One end of the primary coil of the pulse transformer 52 is connected to the positive electrode of a dc power source 58 through a diode 60 of reversed polarity and a pulse charging reactor 49, and to a first terminal of a self-arc-suppressing switch 55 through a pulse capacitor 57. The other end of the primary coil of the pulse transformer 52 is connected through a pulse reactor 61 to a second terminal of the self-arc-suppressing switch 55. The negative electrode of the dc power source 58 is connected to the first terminal of the self-arc-suppressing switch 55. A connecting line c is connected to the self-arc-suppressing switch 55.

Figure 23:
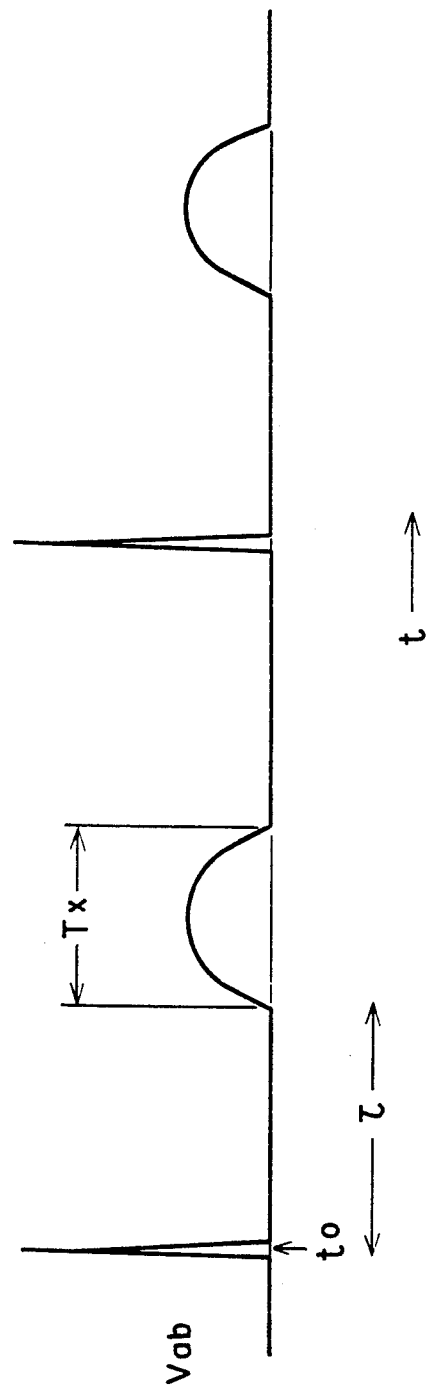
FIG. 23 is a time chart showing the timing of application of voltage to a discharge tube.

Timing of applying a pulse voltage to the discharge tube 2 of the substance vaporizing apparatus in the tenth embodiment is shown in FIG. 23.

Upon the reception of a control signal from the pulse control circuit 19, the first pulse circuit 200 applies a first pulse voltage through a sealed tube 11 across the electrodes 1 to form a discharge in the discharge tube 2. The delay circuit 51 transfers the control signal provided by the pulse control circuit 19 to the second pulse generating circuit 300 with a predetermined delay.

When the self-arc-suppressing switch 55 of the second pulse generating circuit 300 is closed by a signal provided by the delay circuit 51, the electrical energy of a voltage stored in the pulse capacitor 57 is applied across the primary coil of the pulse transformer 52. Then, a voltage n times greater than the voltage applied across the primary coil of the pulse transformer 52 appears across the secondary coil of the pulse transformer 52 and a second pulse voltage is applied across the auxiliary electrodes 101 of the discharge tube 2 through the filter capacitor 53 and the filter reactor 54.

Pulse voltages $V_{ab}$ are applied between the connecting lines a and b in a mode as shown in FIG. 23. The first pulse generating circuit 200 applies a first pulse voltage between the electrodes of the discharge tube 2 at time $t_0$ to form a discharge. The second pulse generating circuit 300 applies a second pulse voltage between the auxiliary electrodes 101 with a predetermined delay time $\tau$ with respect to the application of the first pulse voltage. The sequential application of the first pulse voltage between the electrodes 1, and the second pulse voltage between the auxiliary electrodes 101 is repeated periodically.

Since the surface area of the auxiliary electrodes 101 is small, discharges are formed at a fixed position, discharges are formed uniformly in the discharge space defined by the discharge tube 2, and hence the atoms are relaxed stably from the lower energy level to the ground energy level. The filter reactor 54 and the filter capacitor 53 function as a low-pass filter which is reactive to the first pulse voltage generated by the first pulse generating circuit 200 and are inductive to the second pulse voltage generated by the second pulse generating circuit 300.

The pulse width Tx of the second pulse voltage generated by the second pulse generating circuit 300 is a function of the inductance Lx of the pulse reactor 61 and the capacitance Cx of the pulse capacitor 57 and is expressed by:

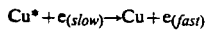

$$Tx \simeq \pi(Lx \cdot Cx)^{\frac{1}{2}}$$

The pulse width Tx is greater than that of the first pulse voltage generated by the first pulse generating circuit 200.

The relaxation of the atoms from the lower energy level to the ground energy level is caused by the superelastic collision of the atoms on the low energy level and slow electrons when the discharge tube 2 has a comparatively large diameter, which is expressed by:

$$Cu^* + e_{(slow)} \rightarrow Cu + e_{(fast)}$$

where Cu* is copper atoms on the lower energy level, Cu is copper atoms on the ground energy level, $e_{(slow)}$ is slow electrons and $e_{(fast)}$ is fast electrons.

The second pulse voltage generated by the second pulse generating circuit 300 is a low voltage unable to excite the atoms to a higher energy level, but the second pulse voltage is able to accelerate the electrons, and hence frequent collision of the atoms and the electrons occurs. Consequently, the relaxation of the atoms from the lower energy level to the ground energy level is promoted by the active superelastic collision of the atoms on the lower energy level and the electrons.

A voltage obtained by chopping the dc power source 58 may be applied across the discharge tube 2 instead of the voltage of the pulse capacitor 57.

Any suitable on-off switch may be used instead of the self-arc-suppressing switch 55.

The substance vaporizing apparatus in the first embodiment according to the present invention which uses a vapor of a substance generated by heating the substance in a gas-filled tube as an exciting medium or an ionizing medium is provided with a container containing the substance, disposed within the gas-filled tube and provided with a plurality of through holes in its wall. The container emits the vapor of the substance generated therein through the through holes. The rate of emission of the vapor is controlled by the diameter of the through holes to enhance the output, efficiency of utilization, quality and function of the substance vaporizing apparatus.

The substance vaporizing apparatus in the second embodiment according to the present invention comprises one or a plurality of containers containing a substance and provided each with a plurality of through holes in its wall. The respective diameters of the through holes nearer to the axially opposite ends of the container is greater than those of the through holes nearer to the middle of the container or intervals between the through holes nearer to the axially opposite ends of the container are smaller than those of the through holes nearer to the middle of the container. Thus, the substance vaporizing apparatus has effect, in addition to that of the substance vaporizing apparatus in the first embodiment, of increasing the efficiency of space utilization, forming the apparatus in a compact construction and enhancing the output.

The substance vaporizing apparatus in the third embodiment according to the present invention comprises a gas-filled tube, and a porous member wrapping a substance and disposed within the gas-filled tube. The porous member has first and second effects of the invention, reduces the cost of the substance vaporizing apparatus, simplifies the substance vaporizing apparatus and facilitates the operation of the substance vaporizing apparatus.

The substance vaporizing apparatus in the fourth embodiment according to the present invention comprises a gas-filled tube, and a plurality of containers containing a substance, arranged around a discharge space defined by the gas-filled tube, and provided each with at least one through hole in its wall. The vapor of the substance is emitted through the through holes of the containers into the discharge space so that a uniform vapor density distribution is established in the gas-filled tube. The rate of emission of the vapor can be controlled by selectively determining the diameters of the through holes. Thus, the substance vaporizing apparatus has high efficiency of utilization and can be formed in a compact construction.

The substance vaporizing apparatus in the fifth embodiment according to the present invention comprises a gas-filled tube defining a discharge space, a container containing a substance and disposed within the discharge space, and a holding member fixedly holding the container. The holding member enables the container to be disposed at a desired position suitable for increasing the efficiency of utilization within the discharge space.

The substance vaporizing apparatus in the sixth embodiment according to the present invention comprises a gas-filled tube, a container containing a substance and provided with at least on through hole in its wall, and a pair of electrodes provided within the container. The electrodes provided within the container promotes the evaporation of the substance within the container and enables the control of the rate and timing of evaporation of the substance. Thus, the substance vaporizing apparatus has high efficiency of utilization and capable of controlling its output.

The substance vaporizing apparatus in the seventh embodiment according to the present invention forms discharges at diametrically different positions to heat the buffer gas substantially uniformly in a plurality of diametrically divided regions in the discharge space, so that the buffer gas can be heated in a substantially uniform temperature distribution with respect to the diameter of the discharge space, and hence the length and diameter of the laser medium can be increased and the duration of laser oscillation in a unit time interval can be increased. Thus, the substance vaporizing apparatus is capable of providing a high laser output.

The substance vaporizing apparatus in the eighth embodiment according to the present invention has a further effect, in addition to that of the substance vaporizing apparatus in the seventh embodiment, of relaxing the atoms from a lower energy level to the ground energy level during the interruption of pulse discharge in each region in the discharge space to suppress the increase of the number of atoms excited to the lower energy level by the pulse discharge formed by each pair of electrodes by sequentially forming discharges in the diametrically divided regions in the discharge space. Thus, the substance vaporizing apparatus is capable of providing a high laser output.

The substance vaporizing apparatus in the ninth embodiment according to the present invention has an effect, in addition to the foregoing effects, of promoting the relaxation of atoms from a lower energy level to the ground energy level by the tubes B provided in the discharge space to cause the frequent collision of the atoms of the vapor against the walls of the tubes during the interruption of pulse discharge. Thus, the substance vaporizing apparatus has a comparatively long laser output period and a high laser output.

The substance vaporizing apparatus in the tenth embodiment according to the present invention comprises a first pulse generating circuit, and a second pulse generating circuit which generates a second pulse voltage with a predetermined delay time with respect to a first pulse voltage generate by the first pulse generating circuit. Therefore, the time required for the relaxation of the atoms from a lower energy level to the ground energy level is reduced, whereby a population inversion is improved by the application of the next first pulse voltage. The auxiliary electrodes having a small surface area stabilizes discharges and the position for discharge, so that the relaxation of the atoms occurs uniformly in the discharge space. Thus, the substance vaporizing apparatus operates stably at a high laser producing efficiency at a high discharge frequency.

What is claimed is:

1. A substance vaporizing apparatus for generating a vapor of a substance for use as an excited medium or an ionized medium in a vapor ion laser and wherein the vapor is generated by heating the substance in a gas-filled tube, comprising a container for containing the substance, said container being disposed within the gas-filled tube and being provided with at least one hole extending through its wall to connect the interior of said container with the interior of said gas-filled tube, thereby forming a flow passage for vapor generated within said container to flow from the interior of said container into the interior of said gas-filled tube.

2. A substance vaporizing apparatus for generating a vapor of a substance for use as an excited medium or an ionized medium in a vapor ion laser and wherein the vapor is generated by heating the substance in a gas-filled tube, comprising at least one container for containing the substance, said at least one container being disposed within the gas-filled tube and being provided with a plurality of holes extending through its wall to connect the interior of said at least one container with the interior of said gas-filled tube, thereby forming a flow passage for vapor generated within said at least one container to flow from the interior of said at least one container into the interior of said gas-filled tube; characterized in that (i) the respective diameters of said holes nearer to the axially opposite ends of the tube are greater than the diameters of said holes nearer to the middle of the tube or (ii) the intervals between said holes nearer to the axially opposite ends of the tube are smaller than the intervals between said holes nearer to the middle of the tube, whereby the combined area of said holes per unit length of said tube is greater nearer to the axially opposite ends of the tube than nearer to the middle of the tube and the vapor emitting rate of the container is thereby varied with respect to the axial direction of the gas-filled tube so that a substantially uniformly distributed vapor density is established in the axial direction within the tube.

3. A substance vaporizing apparatus for generating a vapor of a substance for use as an excited medium or an ionized medium in a vapor ion laser and wherein the vapor is generated by heating the substance in a gas-filled tube, comprising a porous member positioned to extend around said substance, said porous member being positioned within the gas-filled tube and providing a porous flow path for vapor generated within said porous member to flow from the interior of said porous member into the interior of said gas-filled tube.

4. A substance vaporizing apparatus for generating a vapor of a substance for use as an excited medium or an ionized medium in a vapor ion laser and wherein the vapor is generated by heating the substance in a gas-filled tube, comprising a plurality of containers for containing the substance, said containers being arranged around a discharge space defined by the gas-filled tube, each of said containers being provided with at least one hole extending through its wall to connect the interior of said container with said discharge space, thereby forming a flow passage for vapor generated within said container to flow from the interior of said container into said discharge space of said gas-filled tube.

5. A substance vaporizing apparatus for generating a vapor of a substance for use as an excited medium or an ionized medium in a vapor ion laser and wherein the vapor is generated by heating the substance in a gas-filled tube, comprising: one or a plurality of containers for containing the substance disposed within the gas-filled tube; and a holding member fixedly holding the container or containers in a fixed position within the gas-filled tube, each of said containers being provided with means connecting the interior thereof with the interior of said gas-filled tube to form a flow passage for vapor generated within said container to flow from the interior of said container into said discharge space of said gas-filled tube.

6. A substance vaporizing apparatus for generating a vapor of a substance for use as an excited medium or an ionized medium in a vapor ion laser and wherein the vapor is generated by heating the substance in a gas-filled tube, comprising a container for containing the substance disposed within the gas-filled tube and being provided with at least one hole extending through its wall to connect the interior of said container with the interior of said gas-filled tube, thereby forming a flow passage for vapor generated within said container to flow from the interior of said container into the interior of said gas-filled tube; and a pair of electrodes provided within the container for vaporizing the substance.

7. A substance vaporizing apparatus for generating a vapor of a substance for use as an excited medium or an ionized medium in a vapor ion laser and wherein the vapor is generated by heating the substance in a gas-filled tube comprising: a gas-filled tube defining a discharge space; and a pair of electrodes disposed axially opposite to each other within the discharge space for vaporizing a substance by discharge; characterized in that at least one of the electrodes is a segmental electrode consisting of a plurality of partial electrodes diametrically arranged at intervals within the discharge space.

8. A substance vaporizing apparatus according to claim 7, further comprising a pulse phase controller for sequentially applying pulse voltages of different phases to the plurality of partial electrodes, respectively.

9. A substance vaporizing apparatus according to claim 7 or 8, wherein a plurality of tubular containers are provided within said discharge space to form substance vaporizing spaces within said discharge space.

10. A substance vaporizing apparatus according to claim 7 or 8, wherein a tubular container is provided within said discharge space for each pair of partial electrodes, each of said tubular containers forming a substance vaporizing space between said pairs of partial electrodes within said discharge space.

11. A substance vaporizing apparatus for generating a vapor of a substance for use as an excited medium or an ionized medium in a vapor ion laser and wherein the vapor is generated by heating the substance in a gas-filled discharge tube comprising: a first pulse generating circuit for generating a first pulse voltage to produce laser oscillation in the discharge tube; a second pulse generating circuit for applying a second pulse voltage across the discharge tube with a predetermined time delay with respect to the first pulse voltage; and auxiliary electrodes provided at the opposite ends of the discharge tube electrically connected to receive the second pulse voltage.

* * * * *